US010789596B2

(12) United States Patent
Wang et al.

(10) Patent No.: US 10,789,596 B2
(45) Date of Patent: Sep. 29, 2020

(54) GENERATING AND UTILIZING USER IDENTIFYING DIGITAL VISUAL CODES IN ELECTRONIC PAYMENT TRANSACTIONS

(71) Applicant: Facebook, Inc., Menlo Park, CA (US)

(72) Inventors: Shen Wang, Mountain View, CA (US); Akshay Mittal, Mountain View, CA (US); Thilak Thenpandyian, Menlo Park, CA (US); Francesco Fogu, San Francisco, CA (US); Yichen Jia, Sunnyvale, CA (US); Shuo Song, Palo Alto, CA (US)

(73) Assignee: FACEBOOK, INC., Menlo Park, CA (US)

(*) Notice: Subject to any disclaimer, the term of this patent is extended or adjusted under 35 U.S.C. 154(b) by 864 days.

(21) Appl. No.: 15/164,631

(22) Filed: May 25, 2016

(65) Prior Publication Data

US 2017/0344994 A1 Nov. 30, 2017

(51) Int. Cl.
*G06Q 20/40* (2012.01)
*G06Q 20/32* (2012.01)
*G06Q 50/00* (2012.01)
*G06Q 20/38* (2012.01)

(52) U.S. Cl.
CPC ....... *G06Q 20/405* (2013.01); *G06Q 20/3274* (2013.01); *G06Q 20/387* (2013.01); *G06Q 50/01* (2013.01)

(58) Field of Classification Search
CPC . G06Q 20/12; G06Q 20/3226; G06Q 20/3276
USPC .......................................................... 705/44
See application file for complete search history.

(56) References Cited

U.S. PATENT DOCUMENTS

| 9,757,644 B2* | 9/2017 | Rose ..................... G06Q 20/12 |
| 2012/0267432 A1 | 10/2012 | Kuttuva |
| 2013/0112760 A1 | 5/2013 | Schory et al. |
| 2014/0129428 A1* | 5/2014 | Tyler .................. G06Q 20/3226 705/39 |

(Continued)

OTHER PUBLICATIONS

Malcom, H., "Walmart launching mobile payments in stores," USA Today, Dec. 10, 2015, http://www.usatoday.com/story/money/2015/12/10/walmart-launches-in-store-digital-payments-walmart-pay/77040112/.

(Continued)

*Primary Examiner* — Clifford B Madamba
(74) *Attorney, Agent, or Firm* — Keller Jolley Preece

(57) ABSTRACT

One or more embodiments of the disclosure include systems and methods that generate and utilize digital visual codes in electronic payment transactions. In particular, in one or more embodiments, the disclosed systems and methods generate digital visual codes that embed information regarding a user account of a payor (i.e., a user account of the payor within a social networking system). In one or more embodiments, the disclosed systems and methods display the digital visual codes via a payor computing device, scan the digital visual codes via a payee computing device, and send an identifier of the payor to the social networking system based on scanning the digital visual codes. The social networking system then utilizes the identifier to identify the payor, send and receive confirmation from the payor, and finalize the payment transaction between the payor and the payee.

20 Claims, 18 Drawing Sheets

(56) References Cited

U.S. PATENT DOCUMENTS

2015/0088674 A1* 3/2015 Flurscheim ........ G06Q 20/3276
　　　　　　　　　　　　　　　　　　　　705/17

OTHER PUBLICATIONS

Alba, D., "Walmart Pay Is Going to Stick It to Apple Paywith...QR Codes?," Wired magazine, Dec. 10, 2015, http://www.wired.com/2015/12/walmart-pay-is-going-to-stick-it-to-apple-pay-with-qr-codes/.

* cited by examiner

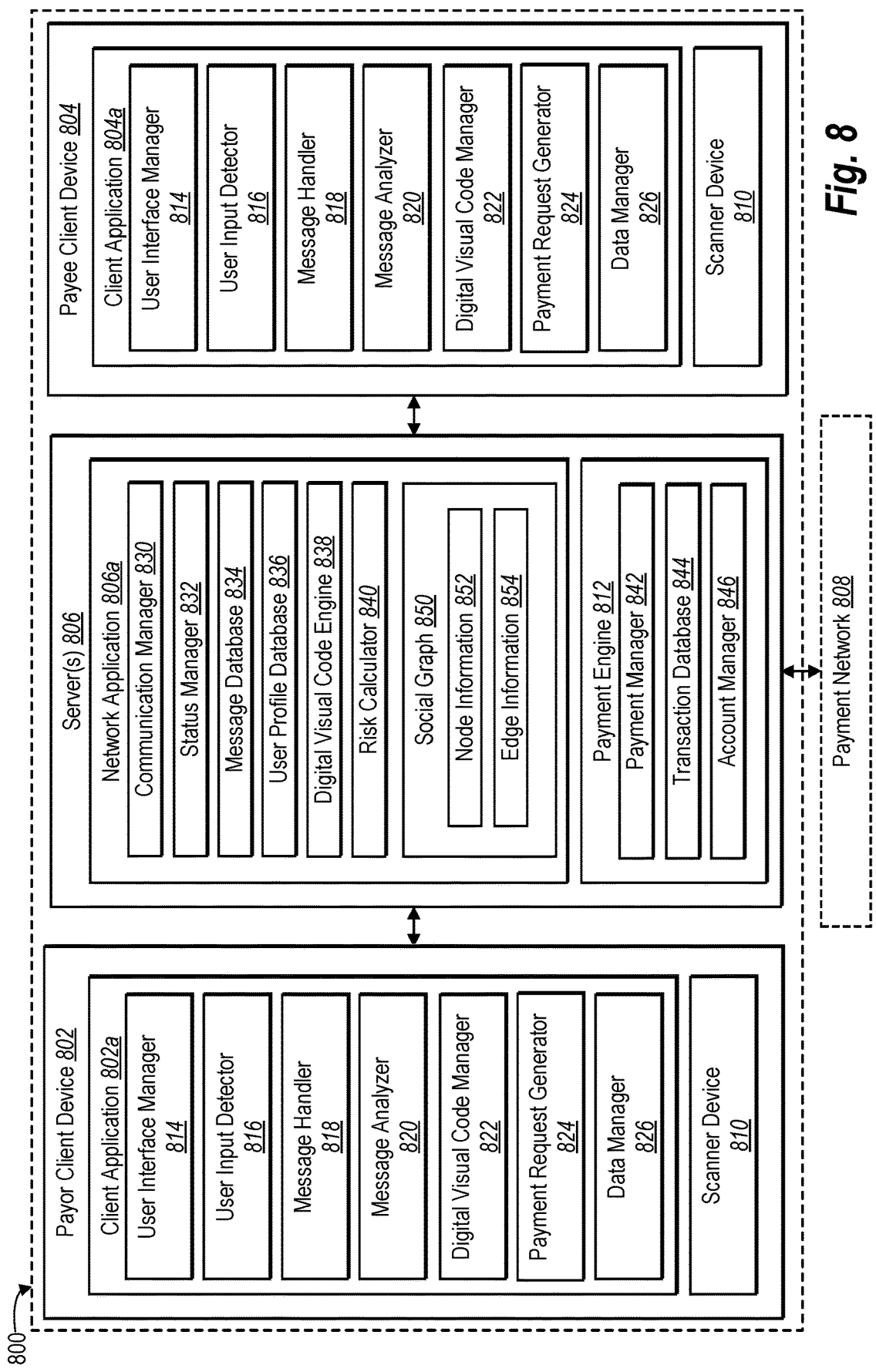

GENERATING AND UTILIZING USER IDENTIFYING DIGITAL VISUAL CODES IN ELECTRONIC PAYMENT TRANSACTIONS

BACKGROUND

Recent years have seen a rapid proliferation in the use of mobile computing devices. For example, individuals and businesses increasingly utilize smartphones, tablets, and other mobile devices for tasks ranging from entertainment to employment. In particular, in recent years, individuals and businesses have increasingly utilized mobile devices to facilitate payment transactions. Indeed, individuals now utilize mobile devices to send payments to, and receive payments from, friends, family, and/or businesses.

Although conventional mobile payment systems allow individuals to send and receive payments, such systems also have a variety of problems. For example, users of conventional mobile payment systems often express frustration with the amount of time required to locate and identify transaction partners (e.g., payors or payees) within a mobile payment system. This is significant, because in the present digital environment, users increasingly demand near-instantaneous electronic payment transactions.

In addition, although conventional mobile payments systems allow businesses to receive payments from customers, many businesses often refuse to utilize conventional mobile payment systems. For example, as a result of time, convenience, and security concerns, many businesses continue to utilize expensive, complex, and inconvenient point of sale and credit card/debit card processing systems for receiving payments from consumers. Such systems add significant expense to vendors, and often impose a considerable financial hurdle for small and medium sized businesses. Moreover, despite expending significant cost in employee man-hours to operate them, such systems often result in long check-out lines and customer dissatisfaction.

SUMMARY

One or more embodiments described below provide benefits and/or solve one or more of the foregoing or other problems in the art with systems and methods for generating and utilizing user-identifying digital visual codes in electronic payment transactions. In particular, in one or more embodiments, the disclosed systems and methods utilize digital visual codes (e.g., quick response or "QR" codes) to identify a payor and complete a payment transaction between a payor to a payee. Specifically, in one or more embodiments, the disclosed systems and methods provide digital visual codes for display at a mobile device of a payor (e.g., via a digital communication application or social networking application). The disclosed systems and methods scan the digital visual code via a computing device corresponding to the payee. By scanning the digital visual code, in one or more embodiments, the disclosed systems and methods identify the payee (e.g., by leveraging a digital communication or social networking system associated with the payor) and complete a payment from the payor to the payee.

For example, in one or more embodiments, the disclosed systems and methods identify, by a payee computing device, a product and a product cost. In addition, the disclosed systems and methods scan, by the payee computing device, a digital visual code displayed on a payor mobile device (i.e., a digital visual code generated by a digital communication system or a social networking system that identifies a user account of the payor in relation to the digital communication or social networking system). In addition, the systems and methods send an indicator of the user account of the payor to the digital communication or social networking system based on scanning the digital visual code to initiate a payment transaction via the digital communication or social networking system.

By utilizing a digital visual code (e.g., a QR code displayed on a payor mobile device) to identify a payor via a digital communication or social networking system, the disclosed systems and methods can reduce the time, complexity, and expense required to complete a payment transaction. The disclosed systems and methods can also increase transaction security.

Indeed, whether in person-to-person, person-to-business, or business-to-business transactions, the disclosed systems and methods provide an elegant solution to common problems in utilizing computing devices to complete electronic payment transactions. For example, embodiments of the disclosed systems and methods can significantly reduce time to identify a payor in electronic payment transactions; reduce consumer check-out times; eliminate the need for complex point of sale and debit/credit card processing systems; and enable convenient, simultaneous payment by multiple payors. Furthermore, the disclosed systems and methods can increase security of payment transactions by avoiding exchange of credit card/debit card information, periodically modifying digital visual codes, and/or utilizing information available from a digital communication or social networking system to reduce transaction risk.

Additional features and advantages of will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

FIG. 8 illustrates a schematic diagram of a digital payment system in accordance with one or more embodiments.

DETAILED DESCRIPTION

Figure 1A:
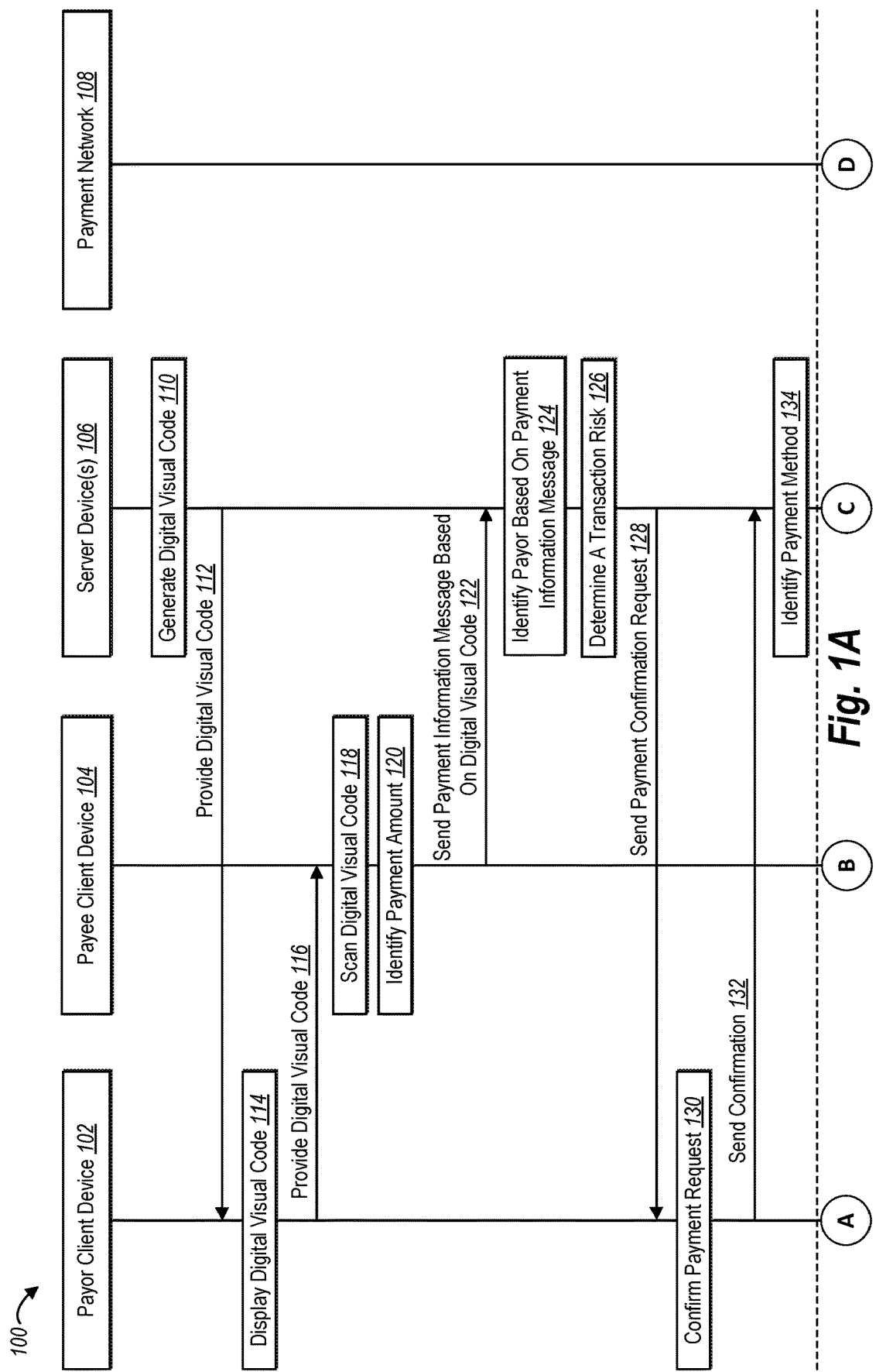
FIGS. 1A-1B illustrate a sequence diagram illustrating a plurality of steps in a method of facilitating payment utilizing digital visual codes in accordance with one or more embodiments.

One or more embodiments of the present invention include a digital visual code payment system that generates and utilizes digital visual codes (e.g., QR codes) in payment transactions. In particular, in one or more embodiments, the digital visual code payment system utilizes personalized digital visual codes to quickly, efficiently, and securely identify a payor and complete a payment transaction between the payor and a payee. More specifically, in one or more embodiments, the digital visual code payment system utilizes a digital visual code (e.g., a digital visual code displayed on a mobile device of the payor and scanned by a mobile device of the payee) to identify the payor via a network application. For instance, the digital video code payment system can utilize a digital visual code to identify a user account and payment credentials associated with the payor within a digital communication system or a social networking system. Moreover, the digital visual code payment system can then utilize the digital communication application or social networking system to complete a payment transaction between the payor and the payee.

For example, in one or more embodiments, the digital visual code payment system identifies, by a payee mobile device, a product and a product cost (e.g., by scanning one or more product barcodes). In addition, the digital visual code payment system scans, by the payee mobile device, a digital visual code displayed on a mobile device of a payor (i.e., a digital visual code generated by a digital communication or social networking system that identifies a user account of the payor in relation to the digital communication or social networking system). Furthermore, the digital visual code payment system sends an indicator of the user account of the payor to the digital communication or social networking system based on scanning the digital visual code to initiate a payment transaction via the digital communication or social networking system.

By utilizing digital visual codes, the digital visual code payment system allows individuals to quickly, efficiently, and securely engage in electronic payment transactions. For example, an individual can make a payment to a friend by simply scanning a digital visual code displayed on the friend's smartphone. The digital visual code payment system can identify the friend based on the digital visual code, send a confirmation message to the smartphone of the friend, and, upon confirmation, facilitate payment from the friend. Users do not need to search through contact lists to identify a transaction partner that can send or receive payments. Rather, individuals can simply scan a digital visual code to complete a payment transaction.

Similarly, in accordance with one or more embodiments, merchants can utilize digital visual code payment system to facilitate transactions with consumers (or other businesses). For instance, a merchant can utilize a mobile device implementing the digital visual code payment system to scan product barcodes and then scan a digital visual code displayed on a mobile device of a consumer. The digital visual code payment system can identify the consumer, send a confirmation message to the consumer, and, upon confirmation by the consumer, facilitate payment from the consumer to the merchant.

The digital visual code payment system can also reduce time, expense, and irritation with conventional payment systems. For example, in one or more embodiment, the digital visual code payment system reduces (or eliminates) check-out lines in completing consumer transactions. Indeed, in one or more embodiments, the digital visual code payment system allows consumers to scan product barcodes as they select products from store shelves (e.g., via a scanner on a smartphone). The digital visual code payment system can generate a digital visual code that identifies both the consumer and the products. Accordingly, the merchant can simply scan the digital visual code and complete the payment transaction. In this manner, a consumer can complete a transaction with a merchant by providing a digital visual code for scanning, while avoiding the process of providing products at a checkout line and making payments via credit cards, debit cards, cash, or checks.

Furthermore, in one or more embodiments, the digital visual code payment system can allow merchants to significantly reduce expenses currently utilized for payment processes. Indeed, as mentioned, the digital visual code payment system can be implemented on a mobile device, such as a smartphone or tablet. Accordingly, for the cost of purchasing a smartphone, a vendor can avoid the employment, hardware, software, and service costs of existing point of sale check-out systems and/or payment card processing systems.

The digital visual code payment system can also enable efficient and simple transactions with multiple payors. Because a payee can complete a payment by scanning a digital visual code of a payor, a consumer can utilize the digital visual code payment system to divide a purchase amongst multiple payors by scanning multiple digital visual codes. Similarly, in one or more embodiments, the digital visual code payment system generates digital visual codes that identify multiple payors. Accordingly, a merchant can scan a single digital visual code and complete a payment transaction with each of the multiple payors.

Moreover, in one or more embodiments, the digital visual code payment system provides users with the ability to seamlessly communicate and connect while utilizing a digital visual code in a payment transaction. Indeed, as mentioned above, in one or more embodiments, the digital visual code payment system is implemented as part of a digital communication application and/or social networking application. Thus, the digital visual code payment system can enable communication between payors and payees, generate a digital visual code, and complete a transaction without having to switch between or among different applications.

Furthermore, in one or more embodiments, the digital visual code payment system not only enables communication in conjunction with a payment transaction, but incorporates communications or posts into digital visual codes in completing a payment transaction. For example, the digital visual code payment system can detect a coupon (or other information) in a digital communication from a merchant to a consumer. The digital visual code payment system can generate a digital visual code that incorporates the coupon (or other information) from the digital communication. Thus, at checkout, the merchant can utilize the digital visual code payment system to scan the digital visual code, automatically apply the coupon, identify the consumer, and complete the payment transaction.

Thus, in one or more embodiments, the digital visual code payment system can generate and use a digital visual code that embeds items other than or in addition to a user identifier. For example, in accordance with security and privacy preferences of each user, the digital visual code payment system can generate a QR code that includes information associated with the user accounts on the social networking system. For instance, the digital visual code payment system can analyze edges, nodes, posts, comments, likes, friends, etc. from the social networking system. The digital visual code payment system can also generate a QR code based on information analyzed from the social networking system (e.g., QR codes that reflect user preferences, user interests, events, purchases, or other information described herein in relation to the social networking system).

The digital visual code payment system can also generate a QR code based on one or more digital communications. Indeed, as mentioned previously, the digital visual code payment system can comprise a communication server. The digital visual code payment system can analyze digital communications (e.g., instant messages, text, e-mails, etc.) and generate QR codes that reflect data from the digital communications. For example, digital visual code payment system can detect a coupon, cost, location, time, identity, interest, preference, event, or other information from a digital communication and generate a QR code reflecting the detected information.

In addition, as mentioned above, in one or more embodiments, the digital visual code payment system can increase payment security. For example, in one or more embodiments, the digital visual code payment system generates digital visual codes that omit sensitive personal information (e.g., credit card or debit card information, contact information, passwords, etc.). Indeed, in one or more embodiments, the digital visual code payment system generates a digital visual code with an encoded identifier, such as an encrypted username, that enables a corresponding network application to identify the user. Because the digital visual code embeds a username (without a corresponding passcode or verification credentials), even if a third party intercepts the digital visual code, the third party cannot access any private information or effectuate a fraudulent payment transaction.

Furthermore, in one or more embodiments, the digital visual code payment system further secures transactions by modifying digital visual codes (and/or identifiers corresponding to the digital visual codes). For example, in one or more embodiments, the digital visual code payment system changes digital visual codes (or identifiers) after a number of transactions or a particular timer period. In this manner, the digital visual code payment system can further ensure that digital visual codes are not utilized for a fraudulent payment transaction.

In addition, as mentioned, in one or more embodiments, the digital visual code payment system is implemented in conjunction with a networking system (such as a social networking system or a digital communication system (e.g., video, text, instant message, email). The digital visual code payment system can also utilize information from the networking system to complete a payment transaction utilizing a digital visual code. For example, the digital visual code payment can utilize the networking system to identify potentially fraudulent payment transactions (before they are funded).

Similarly, in one or more embodiments, the digital visual code payment system can utilize information from a social networking system to generate a digital visual code. For example, the digital visual code payment system can generate a digital visual code based on a customer's preferences (e.g., paper or plastic), interests (e.g., potential product needs or advertisements), or events (e.g., upcoming party).

Figure 1B:
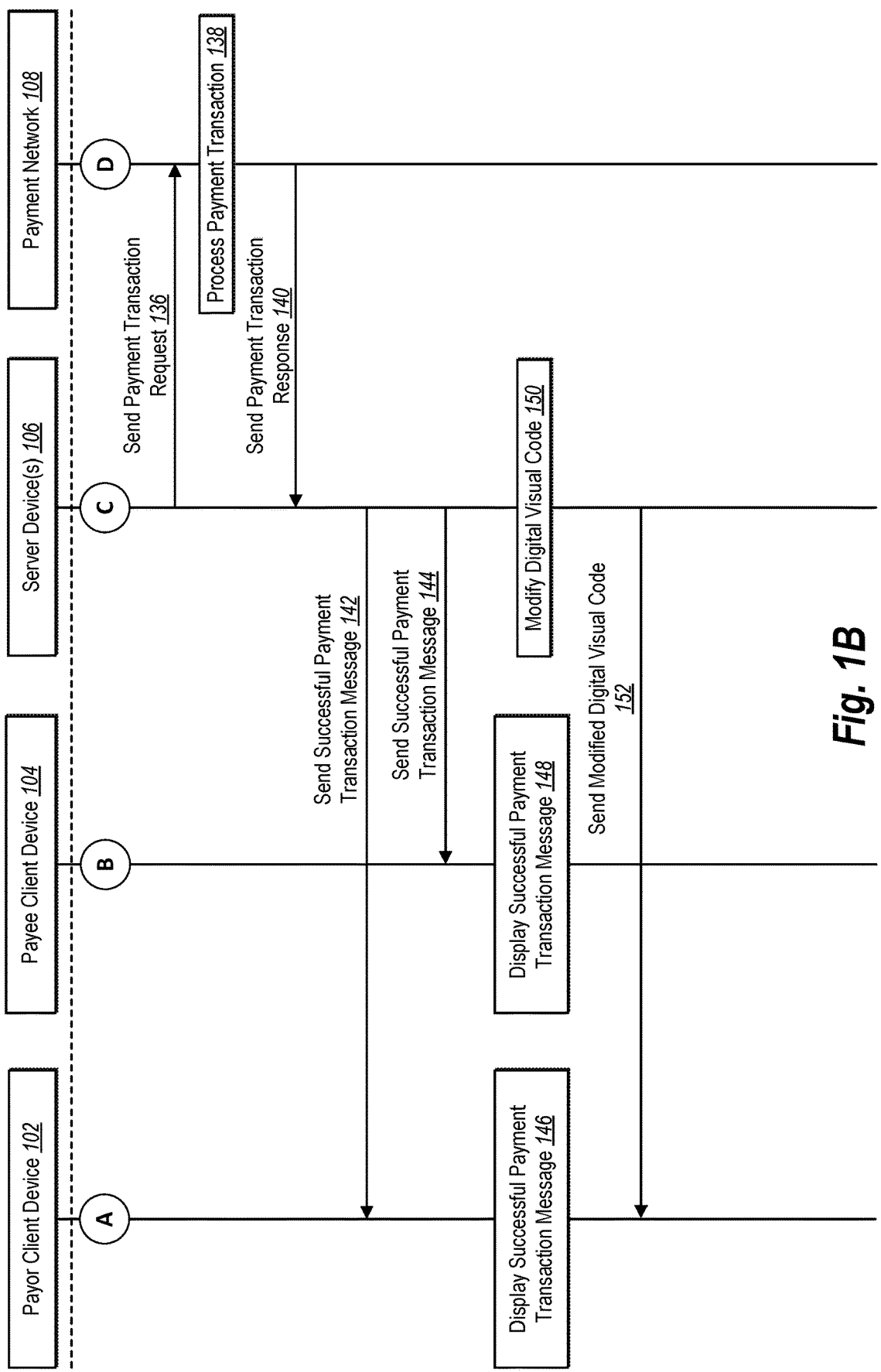

Turning now to FIGS. 1A-1B, additional detail will be provided regarding an example process of generating and utilizing digital visual codes in accordance with one or more embodiments. In particular, FIGS. 1A-1B illustrate a sequence diagram comprising steps that a digital visual code payment system 100 performs in generating and utilizing digital visual codes in electronic payment transactions in accordance with one or more embodiments. More specifically, FIGS. 1A-1B illustrate a sequence flow of operations in relation to a payor client device 102, a payee client device 104, a server device(s) 106, and a payment network 108. The digital visual code payment system 100 can cause each of the payor client device 102, the payee client device 104, the server device(s) 106, and the payment network 108 to perform the steps 110-152 as described below.

As mentioned previously, in one or more embodiments, the payor client device 102 and/or the payee client device 104 comprise computing devices operably connected to an imaging (e.g., scanning) device. For example, in one or more embodiments, the payor client device 102 and the payee client device 104 are operably connected to one or more scanning devices capable of scanning product barcodes and/or digital visual codes. More particularly, in one or more embodiments, the payor client device 102 and the payee client device 104 comprise mobile devices, such as smartphones or tablets, which include scanning devices capable of scanning digital visual codes. In addition to mobile devices, the payor client device 102 and the payee client device 104 can comprise a variety of other types of computing device. Additional detail regarding such computing devices is provided below (e.g., in relation to FIG. 12).

The payor client device 102 can be utilized in conjunction with any payor. For example, the payor client device 102 can be utilized by an individual to pay another individual, by an individual to pay a merchant, by a business to pay another business, or by a merchant to pay an individual. Similarly, the payee client device 104 can be utilized in conjunction with any payee (e.g., individual, merchant, government, or other payee).

In addition, although FIGS. 1A-1B illustrate a single payor client device and a single payee client device, it will be appreciated that in one or more embodiments, the method 100 (and the digital visual code payment system) can include additional payors and/or payees. For example, in one or more embodiments, a single payee can utilize the digital visual code payment system to conduct a payment transaction with multiple payors utilizing multiple payor client devices.

As illustrated in FIG. 1A, in addition to the payor client device 102 and the payee client device 104, the digital visual code payment system 100 can also be implemented in part by the server device(s) 106. The server device(s) 106 may generate, store, receive, and/or transmit data. The server device(s) 106 can comprise a data server, a communication server, and/or a web-hosting server. Moreover, in relation to FIGS. 1A-1B, the server device(s) 106 host a social networking system utilized by the payor and/or the payee.

In addition to the server device(s) 106, the digital visual code payment system 100 can leverage the payment network 108 to complete a payment transaction. The payment network 108 comprises one or more systems operable to transfer funds between two or more financial accounts. For example, in relation to FIGS. 1A-1B, the payment network 108 comprises a payment processing system, a card network system, a sending banking system (associated with a payor financial account), and a receiving banking system (associated with a payee financial account).

As illustrated in FIG. 1A, in one or more embodiments, the digital visual code payment system 100 causes the server device(s) 106 to perform the step 110 of generating a digital visual code. As used herein, the term "digital visual code" refers to a machine-readable matrix barcode. In particular, the term "digital visual code" includes a plurality of modules (e.g., dots, blocks, or other shapes) arranged in an array that can be read by an imaging (e.g., scanning) device. For example, in one or more embodiments, a digital visual code comprises quick response code ("QR code") (i.e., an array of black dotes in a square grid on a background). Digital visual codes can also include other designs, shapes, or images. For example, in one or more embodiments, the digital visual code comprises a QR code in conjunction with an image portrayed in the background of the QR code. Thus, a digital visual code can include an image with an array of modules superimposed on the image.

In one or more embodiments, the server device(s) 106 generate and maintain one or more digital visual codes associated with each user of the digital visual code payment system. For instance, the digital visual code payment system 100 can encode a user identifier for each user into a digital visual code (e.g., QR code) for the user. Thus, the digital visual code can act as a way to identify an account of the user in place of using the user identifier. Once the account is identified as discussed below, the digital visual code payment system 100 can use information associated with the account (such as a payment credential on file for the user, social network data, transaction history, etc.) to process a payment transaction as discussed in greater detail below.

As an example specific to an embodiment in which the digital visual code payment system 100 is integrated with a social networking system, a user may have a username, a user identifier, and an identifier associated with their profile/account with the social networking system. The username can comprise a string of characters chosen by the user by which the user chooses to identify themselves on the social networking system. The username may not be unique to the user. For example, the user may select John Smith as the username. There may be ten, hundreds, or even thousands of other users that selected John Smith as a username. The social networking system can associate one or more of a user identifier or a unique identifier (sometimes referred to herein as an identifier) with the user to uniquely identify the user. For example, a user identifier for the user may a unique string of characters based on the username. In particular, in one or more embodiments, the user identifier can comprise the username with a random string, such as john.smith1466, where 1466 is a randomly generated string. The user identifier can allow the networking system to identify and link to an account/data/payment credentials of the user. In still further embodiments, the networking system can utilize a unique identifier, such as a hash of the username or the user identifier. For example, the unique identifier for the user can be a string of numbers or alphanumeric characters (such as 606664070) obtained by performing a hashing algorithm on the user identifier. In such, cases, the digital visual code can encode the user identifier or the unique identifier.

As mentioned briefly above, in one or more embodiments, the server device(s) 106 generate a digital visual code that identifies or links to a particular user. For instance, in one or more embodiments, the server device(s) 106 generate a QR code that uniquely identifies a payor utilizing the payor client device 102. For example, the server device(s) 106 can generate a digital visual code that embeds a user identifier (e.g., name, username, image, code, or other identifier) corresponding to the payor.

In one or more embodiments, the server device(s) 106 generate a digital visual code that uniquely identifies the payor in relation to a networking system. Indeed, as mentioned previously, in relation to the embodiment of FIG. 1A, the server device(s) 106 host a social networking system utilized by the payor. In particular, the server device(s) 106 host a social networking system where the payor has established a user account with stored payment credentials. Accordingly, in one or more embodiments, the server device(s) 106 generate a QR code that encodes the user or unique identifier associated with the payor's user account in the social networking system. Indeed, in one or more embodiments, the digital visual code (e.g., QR code) consists of an encoded user/unique identifier and is devoid of other information (such as a payment credential, product identifiers, transaction amount, etc.).

In addition to QR codes, the server device(s) 106 can also generate other digital visual codes that require specific software applications to analyze, process, decode, and/or interpret. For example, in one or more embodiments, the server device(s) 106 can provide a software application (e.g., a digital communication application or social networking application) that includes data for interpreting and/or decoding a particular digital visual code format. The server device(s) 106 can generate a digital visual code in relation to step 110 in accordance with the particular digital visual code format.

Although step 110 of FIG. 1A illustrates the server device(s) 106 generating the digital visual code, it will be appreciated that in one or more embodiments, the digital visual code is generated across multiple devices or generated utilizing a different device (e.g., the payor client device 102). For instance, in one or more embodiments, the server device(s) 106 generate a portion of the digital visual code by creating a user or unique identifier, while the digital visual code is visually created for display on another device utilizing the user or unique identifier generated by the server device(s) 106. For example, in one or more embodiments, the server device(s) 106 maintain a database that associates user or unique identifiers with users of the digital visual code payment system. The digital visual code payment system provides the user or unique identifiers to another device (e.g., the payor client device 102), which embeds the user or unique identifier in a digital visual code and provides the digital visual code for display.

As illustrated in FIG. 1A, upon generating a digital visual code, the server device(s) 106 perform the step 112 of providing the digital visual code to the payor client device 102. The server device(s) 106 can send the digital visual code in a variety of forms. For example, in one or more embodiments, the server device(s) 106 transmit an image of a QR code (or other data representative of the QR code) to the payor client device 102. In other embodiments, the server device(s) 106 transmit a user or unique identifier (and/or other information, such as information from the social networking system) to the payor client device 102, and the payor client device 102 utilizes the user or unique identifier (and/or other information) to create a digital visual code that embeds the user or unique identifier (and/or other information). Thus, in one or more embodiments, the payor client device 102 creates a digital visual code that includes a user or unique identifier (and/or other information) received from the server device(s) 106.

The payor may desire to perform financial transaction. In order to do so, the payor may need to identify themselves to a payee. To do so, the payor can provide the payee with their digital visual code, which allows the payee to quickly and efficiently identify the payee. Thus, the digital visual code can allow the payee to identify the user or unique identifier of the payee with out having to search a username, which may or may not be unique. As illustrated in FIG. 1A, the payor client device 102 performs the step 114 of displaying the digital visual code. In particular, the payor client device 102 can provide the digital visual code for display via a display screen operably connected to the payor client device 102. For instance, if the payor client device 102 is a smartphone and/or a tablet with a touchscreen, the payor client device 102 can provide the digital visual code for display via the touchscreen.

As shown in FIG. 1A, the payor client device 102 can also perform the step 116 of providing the digital visual code to the payee client device 104. For instance, in one or more embodiments, the step 116 comprises the payor showing the digital visual code displayed on the payor client device 102 to the payee client device 104. To illustrate, the step 116 can comprise the payor moving a display screen of the payor client device 102 into view of a scanning device of the payee client device 104.

As illustrated in FIG. 1A, the digital visual code payment system 100 also causes the payee client device 104 to perform the step 118 of scanning the digital visual code. As mentioned previously, in one or more embodiments, the payee client device 104 comprises a smartphone with an imaging (e.g., scanning) device. Thus, for example, the step 116 can comprise utilizing a smartphone to scan the digital visual code.

The step 118 can also comprise decoding the digital visual code. For example, upon scanning the digital visual code, the payee client device 104 can identify information embedded in the digital code. In particular, the payee client device 104 can determine a user or unique identifier of the payor embedded in the digital visual code. Optionally, if encoded in the digital visual code, the payee client device 104 can identify product information, product cost information, coupons or special deals, user information (e.g., preferences, interests, or events), or other information from the digital visual code.

Once the payee has the user or unique identifier of the payor, or optionally before, the payee can identify an amount to request or transfer from the payor. As shown in FIG. 1A, the payee client device 104 can perform the step 120 of identifying a payment amount. The payee client device 104 can identify a payment amount in a variety of ways. For example, the payee client device 104 identifies a payment amount by utilizing the payee client device 104 to scan product barcodes. The payee client device 104 can scan product barcodes and identify the corresponding products and/or product costs. For example, the payee client device 104 can scan product barcodes and access a database (i.e., a local database on the payee client device 104 or a database on a remote server) that associates the product barcodes with product names and/or product costs. The payee client device 104 can utilize the product costs to identify a payment amount (e.g., product costs plus tax or divide the product cost amongst multiple payors).

Alternatively, or additionally, the payee client device 104 can identify a payment amount based on user input. For example, in one or more embodiments, the payee or the payor can provide an amount to charge the payor via the payee client device 104. For example, the payee can modify a payment amount to reflect a tip, the payor can request "cash back" and increase the payment amount to reflect the amount of cash requested, and/or the payee can modify a payment amount based on a refund, voucher, or returned product.

To initiate the payment transaction, as shown in FIG. 1A, the payee client device 104 can also perform the step 122 of sending a payment information message based on the digital visual code (e.g., a payment request based on the digital visual code). As used herein, the term "payment information message" refers to a message that indicates payment information that allows the system to initiate a payment transaction. For example, a payment information message can include a data package that includes a payment amount, a sender, a recipient, a payment method, formatting indicating how the system processes the payment method, as well as additional information such as user provided text for a message. Similarly, the term "payment information message" can include a payment request (i.e., a request for payment that includes a payment amount, sender, recipient, and/or payment method).

The payee client device 104 can send a payment information message that includes information identified from the digital visual code, such as a user or unique identifier of the payor together with a payment amount. In one or more embodiments, the payment information message can also or alternatively comprise the digital visual code itself. The payment information message can also include any other information necessary to request a payment. For example, the payment information can comprise a user or unique identifier of the payee or a payment method.

As shown in FIG. 1A, upon receiving the payment information message, the server device(s) 106 perform the step 124 of identifying the payor based on the payment information message. For example, if the payment information message includes a user or unique identifier of the payor, the server device(s) 106 can utilize the user or unique identifier to determine a user account and/or payment credential associated with the payor. As used herein, the term "payment credential" refers to credentials for accessing a financial account. For example, the term "payment credential" includes a debit card number, a credit card number, a bank account number, or an access token.

The server device(s) 106 can map the user or unique identifier to an account of the payor. Similarly, if the payment information message includes a digital visual code, the server device(s) 106 can interpret or decode the digital visual code and identify the account of the payor based on information embedded in the digital visual code. Then the server device(s) can access a payment credential associated with the account.

As mentioned, in one or more embodiments, the server device(s) 106 host a social networking system corresponding to the payor. Accordingly, in one or more embodiments, identifying the payor based on the payment information message comprises identifying a user account of the payor corresponding to the networking system. The server device(s) 106 can then utilize information from the networking system (e.g., a stored payment credential) associated with the identified user account of the payor to complete the payment transaction.

Similarly, the server device(s) 106 can also identify the payee. For instance, in one or more embodiments, the payment information message includes information identifying the payee in relation to the networking system (e.g., a user or unique identifier for the payee). The server device(s) 106 can also identify a user account and/or payment credentials of the payee corresponding to the social networking system based on the payment information message. The server device(s) 106 can utilize information regarding the payee from the networking system to complete the payment transaction.

Additionally, prior to completing the payment transaction, as illustrated in FIG. 1A, the server device(s) 106 can perform the step 126 of determining a transaction risk. In particular, the server device(s) 106 can utilize information from a social network to determine transaction risk and avoid fraudulent payment transactions. For instance, the server device(s) 106 can determine a risk based on any edge and/or node information corresponding to a social graph. To illustrate, the server device(s) can base transaction risk on location information (e.g., current location, locations visited, locations of interest), calendar information (e.g., events planned), a list of contacts on the social networking system (e.g., "friends" on the social networking system), a list of items of interest on the social networking system (e.g., "likes" on the social networking system), comments/complaints on the social networking system (e.g., payee has had multiple complaints regarding payment transactions), user interest (e.g., topics and/or products determined to be of interest to the user), payment history (e.g., previous purchases between a payor and/or payee or similar merchants and vendors), activity on the social network (e.g., articles, images, videos, or other media viewed on the social networking system), indications of disinterest or displeasure on the social networking system (e.g., blocking a "friend," skipping a social media post, "unfollowing" an individual or business), previous payments (e.g., previous transactions between payor and/or payee), and/or previous communications (e.g., text messages, instant messages, social media messages, comments, and/or posts between the payor and/or payee). For example, the server device(s) 106 can determine that a payor has previously interacted with the payee on the social networking system (i.e., payor has "liked" the payee or is "friends" with the payee). Based on the determination of prior interaction on the social networking system, the server device(s) 106 can determine that a transaction has a lower risk.

Moreover, the server device(s) 106 can determine that a payor has little or no interaction with a payee on a social networking system. For example, the server device(s) 106 can determine that a payor resides in a different location, has little interest in the products sold by a payee, and/or has affirmatively expressed disinterest or displeasure with the payee (e.g., "unfriended" the payee or "blocked" the payee). In response, the server device(s) 106 can determine that a transaction has a higher risk.

The server device(s) 106 can calculate a risk value with regard to each transaction and compare the risk value to a risk threshold. If the risk value exceeds the risk threshold, the server device(s) 106 can perform a variety of steps. For example, the server device(s) 106 can block the payment transaction altogether. The server device(s) 106 can also send a warning message to the payor client device 102 and/or the payee client device 104.

It will be appreciated that the server device(s) 106 can determine transaction risk to protect the payor (i.e., prevent payments to a fraudulent payee) and/or the payee (i.e., prevent payments from a fraudulent payor). Thus, the server device(s) 106 can determine that a payee has received complaints (e.g., negative comments, block requests, negative feedback) on the social networking system and warn the payor. Similarly, the server device(s) 106 can determine that a payor has engaged in a sudden, unexpected spike in spending at a location different from the payor's preferred computing device and alert both the payor and/or the payee.

In addition, in one or more embodiments, the server device(s) 106 assess risk by analyzing a list of contacts selected by the payor and/or the payee. For example, in one or more embodiments, the server device(s) 106 host a social networking system that allows the payor and/or payee to identify a list of contacts (e.g., "friends") with which they are connected. Furthermore, the server device(s) can identify a subset of contacts that a payor and/or payee is willing to interact with in completing payment transactions.

In particular, in one or more embodiments, the server device(s) allow the payor and/or payee to identify a list of particular contacts (i.e., a subset of "friends" or a subset of users of a social networking system) that can utilize a digital visual code (e.g., enter into a payment transaction with the payor and/or payee utilizing the digital visual code). For example, the payor can select a list ten merchants (or other friends) that can utilize the digital visual code payment system to enter into payment transactions with the payor. Upon receiving a payment information message (e.g., payment request), the server device(s) 106 can determine whether the payee is on the list selected by the payor. If the payee is on the list, in one or more embodiments, the digital visual code payment system can allow the payment transaction to move forward (or allow the payment transaction to move forward without certain steps, such as omitting verification credentials). If the payee is not on the list, in one or more embodiments, the digital visual code payment system will cancel the payment transaction (or send a message to the payor indicating that the payee is seeking to initiate a payment transaction).

Upon determining transaction risk (e.g., determining that the transaction risk falls within an acceptable threshold), the server device(s) 106 can proceed with completing a payment transaction. For example, as shown in FIG. 1A, the server device(s) 106 performs the step 128 of generating and sending a payment confirmation request to the payor client device 102. For instance, the server device(s) 106 can generate and send a payment confirmation request to the payor client device 102 that identifies a payee, products, a payment amount, payment credentials, transaction identification number, or other information regarding the payment transaction.

As shown, upon receiving a payment request, the payor client device 102 can perform the step 130 of confirming the payment request. For example, in one or more embodiments, the payor client device 102 provides a user interface that requests confirmation of payment from the payor. The payor client device 102 can provide a user interface illustrating the payee, payment amount, products, payment credentials, transaction identification number, or other information regarding the payment transaction.

Moreover, the payor client device 102 can require verification credentials from the payor to confirm the payment request. For instance, in one or more embodiments, the payor client device 102 requires a passcode, password, fingerprint, voice print or other verification credential to confirm the payment. As shown in FIG. 1A, the payor client device 102 can also perform the step 132 of sending a confirmation to the server device(s) 106.

Furthermore, to initiate a payment transaction between the payor and the payee, the server device(s) 106 performs the step 134 of identifying a payment method. As mentioned previously, a payor (and a payee) may have a financial account associated with a user account within a social networking system. As used herein, the term "financial account" refers to an account from which money can be deducted or to which money can be deposited. For example, the term "financial account" includes a user's debit card account, bank account, credit card account, messaging account, or gift card.

If the payor (or the payee) has a single financial account associated with the user account, the server device(s) 106 identify the financial account as the financial account associated with the payor account (or the payee account) without any additional input. Alternatively, if the payor (or the payee) has a plurality of financial accounts (e.g., more than one credit/debit cards, deposit accounts, and/or gift cards), the payor (or the payee) may select one of the plurality of financial accounts.

As shown in FIG. 1B, in addition to identifying a payment method, upon receiving confirmation from the payor client device 102, the server device(s) 106 can perform the step 136 of sending a payment transaction request to the payment network 108 (e.g., provide authorization for payment from the server device(s) 106 to the payment network 108). The payment transaction request can comprise any information utilized to authorize/complete the payment transaction. For example, the payment transaction request can include a payor identifier, payee identifier, transaction identification number, payor payment credentials (i.e., account name, account number, sending banking institution), payee payment credentials (i.e., account name, account number, receiving banking institution), and/or a transaction description.

As shown, the payment network 108 then performs the step 138 of processing the payment transaction by transferring funds equal to the payment amount from the financial account for the payor to the financial account for the payee. Transferring funds may involve communicating with one or more gateway systems, card networks, or bank systems.

After the payment network 108 processes the payment transaction, the payment network 108 performs the step 140 of sending a payment transaction response to the server device(s) 106 indicating that the payment transaction was successful. Based on receiving the payment transaction response from the payment network 108, the server device(s) 106 can perform the steps 142, 144 of sending successful payment transaction messages to the payor client device 102 and the payee client device 104. Moreover, the payor client device 102 and the payee client device 104 can perform the steps 146, 148 of displaying the successful payment transaction messages.

The successful payment transaction messages can contain a variety of information regarding that the payment transaction (e.g., payor, payee, transaction identification, payment amount, time, date, etc.). For example, in one or more embodiments, the successful payment transaction message comprises a receipt of the products or services purchased. For example, the payee client device 104 can generate a receipt and send the receipt to the payor client device 102 (directly or via the server device(s) 106).

In addition, as shown in FIG. 1B, the server device(s) 106 can also perform the steps 150 and 152 of modifying the digital visual code and sending the modified digital visual code to the payor client device 102. Indeed, as mentioned previously, in one or more embodiments, the server device(s) 106 maintain a database associating digital visual codes and users (e.g., user accounts). In one or more embodiments, the server device(s) can further modify the digital visual codes to prevent fraudulent use of the digital visual codes.

The server device(s) 106 can modify the digital visual codes based on a variety of factors. For example, in one or more embodiments, the server device(s) 106 modify digital visual codes based on an amount of time (e.g., modify digital visual codes once a day or once a week), a number of payment transactions (e.g., after each payment transaction, after ten payment transactions, after two payment transactions with a particular payee), or a number of sessions initiated at the server device(s) 106 (e.g., change the digital visual code each time the payor client device 102 initiates a different session with the server device(s) 106).

The server device(s) 106 can modify the digital visual code and/or the payor client device 102 can modify the digital visual code in conjunction with the server device(s) 106. For example, as mentioned previously, in one or more embodiments, the server device(s) 106 maintain a database that associates an identifier with a user account and sends the identifier to the payor client device 102 to create a digital visual code. Similarly, in one or more embodiments, the server device(s) 106 modify the digital visual code by modifying the identifier in the database and sending the identifier to the payor client device 102 to create the modified digital visual code. By modifying the digital visual code, the server device(s) 106 makes the digital visual code ineffectual for further payment transactions. Thus, if a payee associated with the payee client device 104 captures an image of the digital visual code (prior to modification), the payee cannot utilize the digital visual code to initiate another payment transaction.

For example, in one or more embodiments, if the payee client device 104 seeks to utilize an outdated digital visual code, the server device(s) 106 will reject the payment request. In particular, the server device(s) 106 can compare a digital visual code (or identifier) sent from the payee client device 104 with a database comprising a modified digital visual code (or modified identifier) and determine that the digital visual code (or identifier) and the modified digital visual code (or identifier) no longer match. Rather, the server device(s) 106 will only initiate payment transactions upon receiving a modified digital visual code (and/or modified identifier).

As just mentioned, the payor client device 102 can utilize a modified digital visual code to initiate another payment transaction. For example, the payor client device 102 can provide the modified digital visual code to a second payee client device associated with a second payee to complete a second payment transaction with the second payee. The second payee client device can transmit the modified digital visual code (or modified identifier) to the server device(s) 106 and the server device(s) 106 can determine that the modified digital visual code (or modified identifier) matches the modified digital visual code (or modified identifier) in the database corresponding to the payor's user account.

As mentioned previously, the digital visual code payment system can utilize one or more user interfaces in generating digital visual codes and completing payment transactions. For example, FIGS. 2A-7B illustrates various user interfaces corresponding to payor and/or payee client devices in accordance with one or more embodiments of the digital visual code payment system.

For instance, as mentioned above, the digital visual code payment system can utilize a digital communication application and/or a social networking application to generate, display, and/or utilize a digital visual code in conjunction with a payment transaction. In particular, FIG. 2A illustrates a computing device 200 displaying a user interface 202 corresponding to a digital communication application 204 (i.e., FACEBOOK® MESSENGER® software application) in accordance with one or more embodiments of the digital visual code payment system.

Figure 2B:
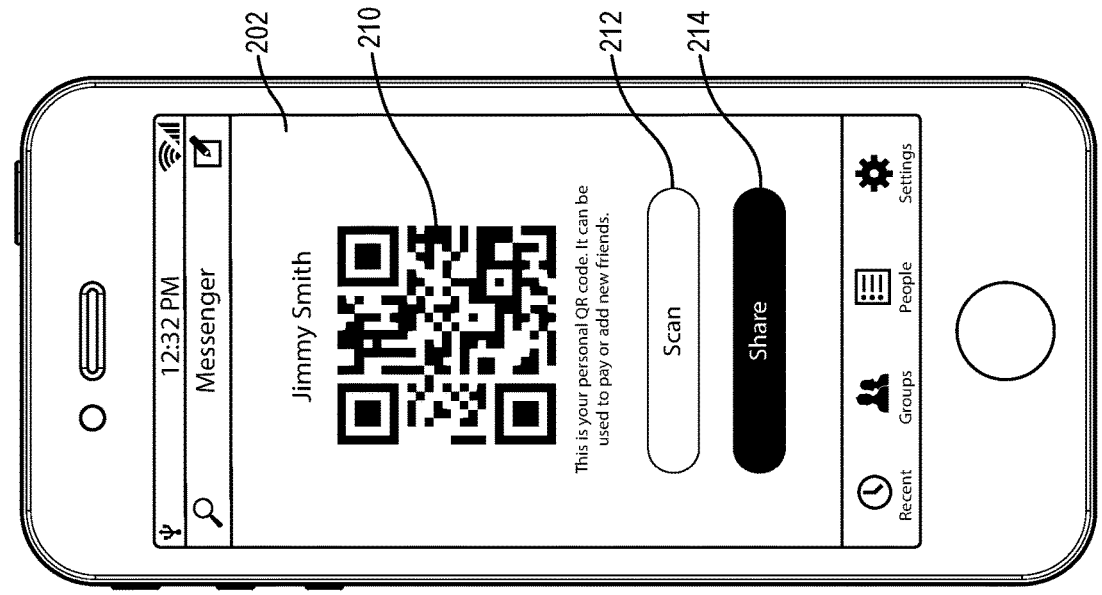
FIG. 2B illustrates a digital visual code displayed via the user interface of the digital communication application of the computing device of FIG. 1A in accordance with one or more embodiments.
Figure 2A:
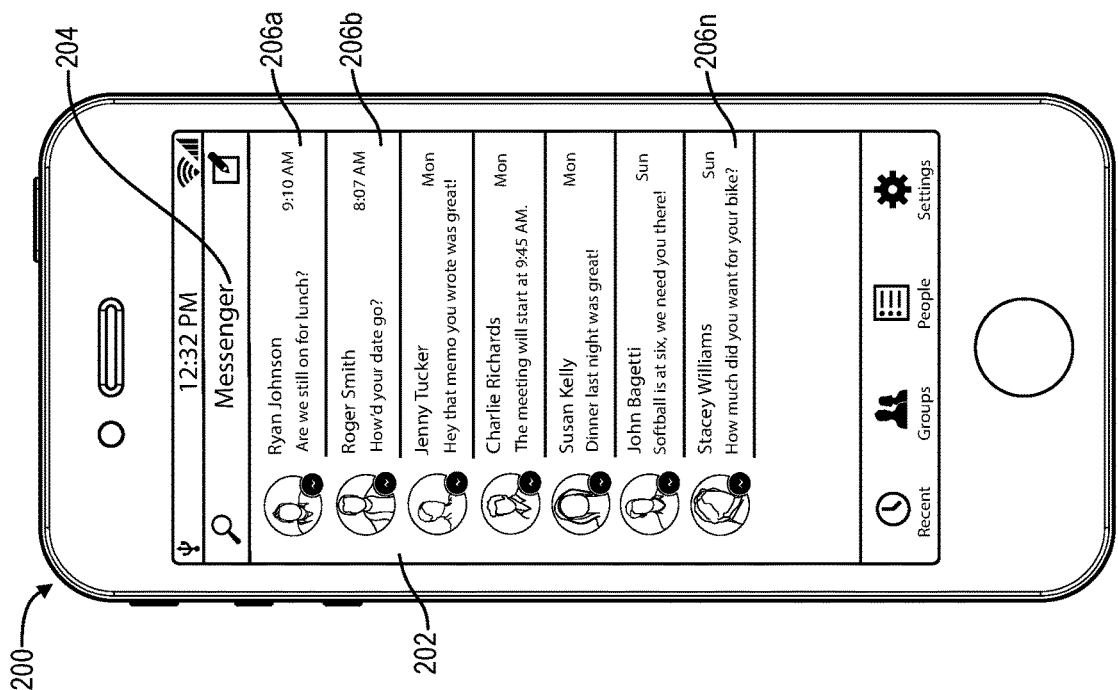
FIG. 2A illustrates a user interface of a digital communication application running on a computing device in accordance with one or more embodiments.

Specifically, as shown in FIG. 2A, the user interface 202 comprises a plurality of communication threads 206a-206n. Upon user interaction with one of the plurality of communication threads 206a-206n (e.g., a touch gesture) the digital visual code payment system can modify the user interface 202 to display one or more communications corresponding to a particular communication thread. Moreover, the digital visual code payment system can modify the user interface 202 to enable a user to draft, send, review, and/or receive additional digital communications.

The digital visual code payment system can modify the user interface 202 to display a digital visual code. For example, FIG. 2B illustrates a digital visual code 210 upon user interaction with the user interface 202 (i.e., in response to a downward swipe on the touchscreen of the computing device 200). Accordingly, the digital visual code payment system allows a user of the computing device 200 to send, receive, and review digital communications (i.e., instant messages) and immediately transition to utilizing a digital visual code.

As shown in FIG. 2B, in addition to the digital visual code 210, the user interface 202 also includes a selectable scan element 212 and a selectable share element 214. As illustrated, the selectable share element 214 is currently activated. Accordingly, the user interface 202 provides the digital visual code 210 for sharing with other users. For instance, a user of the computing device 200 can display the digital visual code to an individual or merchant for scanning by a computing device.

The digital visual code payment system can also modify the user interface 202 to scan digital visual codes or product barcodes. For example, upon user interaction with the selectable scan element 212, the digital visual code payment system can transition to a scanning user interface. In this manner, the digital visual code payment system can permit a payor or a payee to scan digital barcodes and digital visual codes to complete a payment transaction.

Figure 3B:
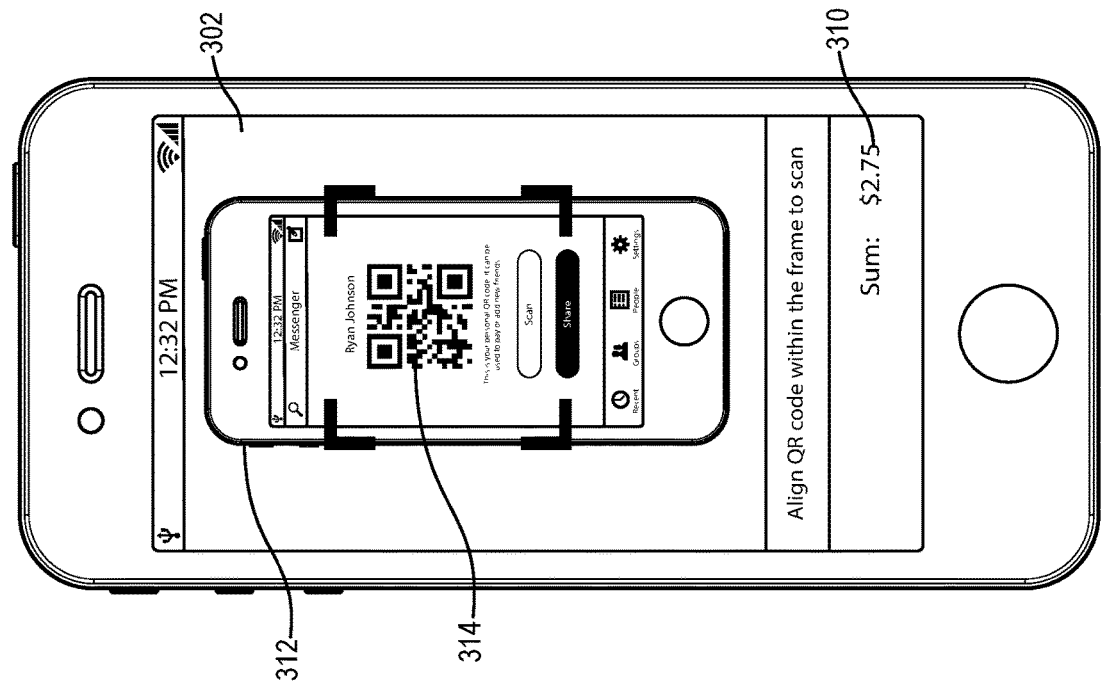
FIG. 3B illustrates a user interface of a computing device for scanning a digital visual code in accordance with one or more embodiments.
Figure 3A:
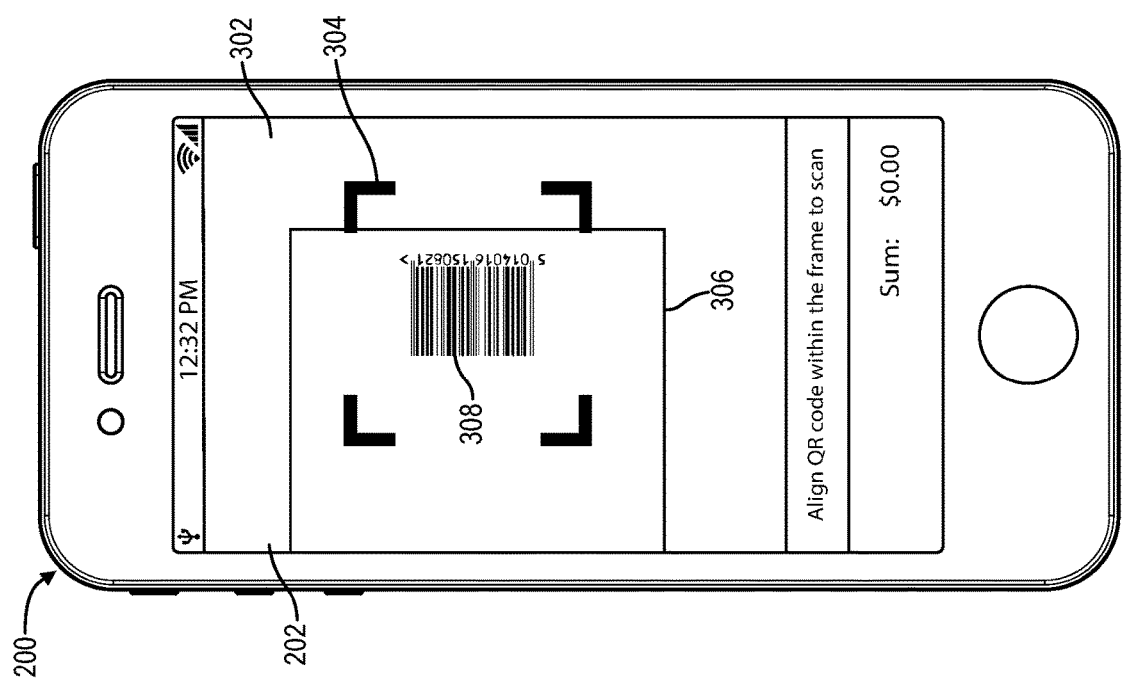
FIG. 3A illustrates a user interface of a computing device for scanning a product barcode in accordance with one or more embodiments.
Figure 3C:
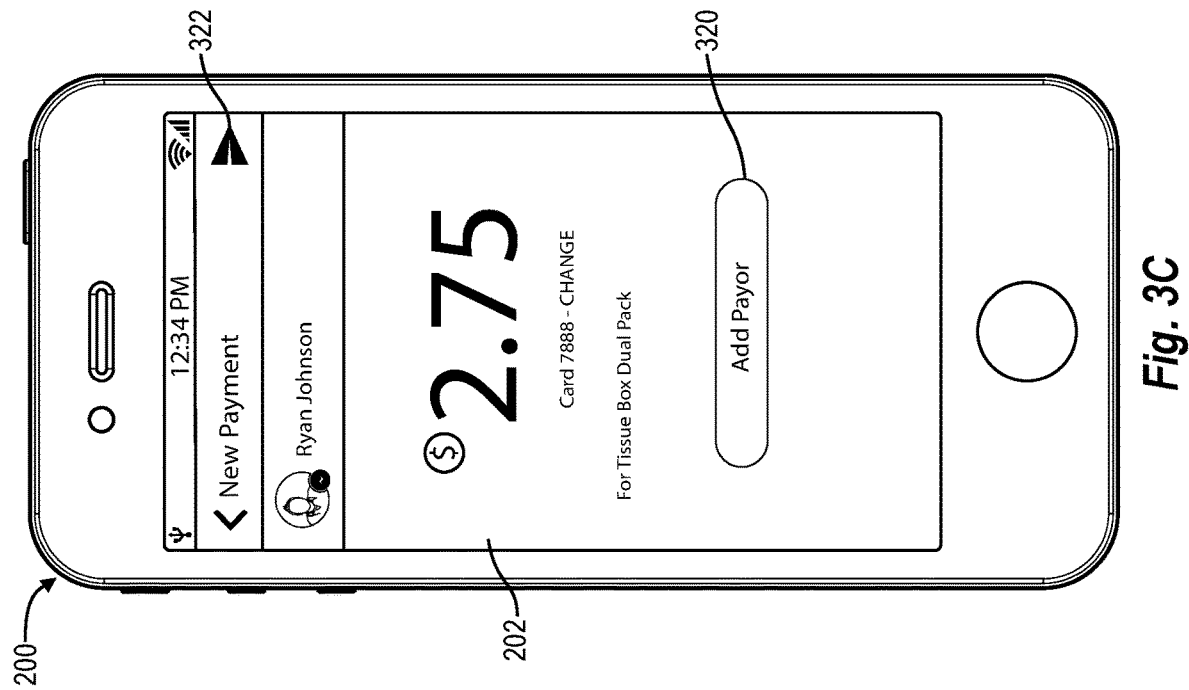
FIG. 3C illustrates a computing device with a user interface displaying a new payment message.

For example, FIGS. 3A-3C illustrate utilizing a user interface for scanning product codes and digital visual codes for sending a payment request. In particular, FIG. 3A illustrates the user interface 202 upon selection of the selectable scan element 212. Specifically, the user interface 202 of FIG. 3A includes an image feed 302 from an imaging device (i.e., a scanning device) operatively coupled to the computing device 200. In particular, the image feed 302 displays sequential images captured by the imaging device in real time. Accordingly, a user of the computing device 200 can arrange the computing device 200 and imaging device to identify and scan product barcodes and/or digital visual images.

Indeed, in FIG. 3A the image feed 302 shows that the imaging device is aimed at a product 306 with a product barcode 308. Moreover, the product barcode 308 is aligned within a frame 304. Accordingly, the imaging device affixed to the computing device 200 scans the product barcode 308. In particular, the computing device 200 scans the product barcode 308 and utilizes the barcode to identify the product and a product cost. More specifically, the computing device scans the product barcode 308 and identifies a product number associated with the product barcode 308. The computing device 200 then accesses a database (e.g., a local or remote database) that associates the product number with the product 306 and a product cost. Thus, as shown in FIG. 3B, upon scanning the product barcode 308, the computing device 200 updates the user interface 202 to display a payment cost 310 (e.g., the product cost).

Moreover, as shown in FIG. 3B, the user interface 202 continues to display the image feed 302, indicating that the computing device 200 can continue to scan product barcodes and/or digital visual images. In particular, as shown in FIG. 3B, the imaging device of the computing device 200 is now aligned to a second computing device 312. Moreover, as shown, the second computing device 312 is displaying a digital visual code 314. By aligning the imaging device to the digital visual code 314 of the second computing device 312, the computing device 200 scans the digital visual code 314.

Upon scanning a digital visual code, in one or more embodiments, the digital visual code payment system analyzes the digital visual code. For example, the digital visual code payment system can analyze the digital visual code to identify a payor corresponding to the computing device 312. Specifically, with regard to the embodiment of FIG. 3B, the digital visual code payment system analyzes the digital visual code 314 and determines that the payor corresponding to the computing device 312 is an individual with a username "Ryan Johnson" (i.e., a username corresponding to a social media network affiliated with "Ryan Johnson").

In addition, upon scanning the digital visual code, in one or more embodiments, the digital visual code payment system also prepares a user interface with a new payment message. For example, FIG. 3C illustrates the computing device 200 with the user interface 202 displaying a new payment message. In particular, the new payment message identifies a payor (e.g., Ryan Johnson), a payment amount (i.e., $2.75), a payment credential (e.g., "Card 7888"), and a product (i.e., "Tissue Box Dual Pack").

The new payment message also includes an add payor element 320. The add payor element 320 enables the digital visual code payment system to add one or more payors to a payment. For example, a user of the computing device 200 can select the add payor element 320 and identify additional payors to contribute payment to the payment amount 310. For example, upon user interaction with the add payor element 320, the digital visual code payment system can modify the user interface 202 to capture another digital visual code corresponding to another payor. In this manner, the digital visual code payment system can enable users to quickly and easily complete a payment transaction with multiple payors.

Moreover, as discussed previously, in one or more embodiments the digital visual code payment system generates digital visual codes that identify a plurality of payors. For example, in one or more embodiments, the digital visual code payment system can determine that a plurality of payors seek to contribute to a payment amount and generate a digital visual code that includes identifiers corresponding to teach of the plurality of payors.

For example, in one or more embodiments, the digital visual code payment system determines that a plurality of payors are eating at the same restaurant (e.g., via an event included in a social networking system). The digital visual code payment system can generate a combined digital visual code indicating the plurality of payors based on the determination that plurality of payors are attending the same event together and a determination that the event will require a payment transaction.

In addition, the user interface 202 of FIG. 3C also illustrates a send payment message element 322. Upon user interaction with the send payment message element 322, the computing device 200 can send a payment message. For example, the computing device 200 can send a payment information message based on the digital visual code 314 to a remote server device (e.g., the server device(s) 106) comprising the payor ("Ryan Johnson").

As mentioned previously, upon receiving a payment information message from a computing device (i.e., from the payee client device 104), the digital visual code payment system can send a message to a computing device associated with a payor. In particular, the digital visual code payment system can identify the payor from the payment information message and send a payment confirmation request to a computing device associated with the payor.

Figure 4B:
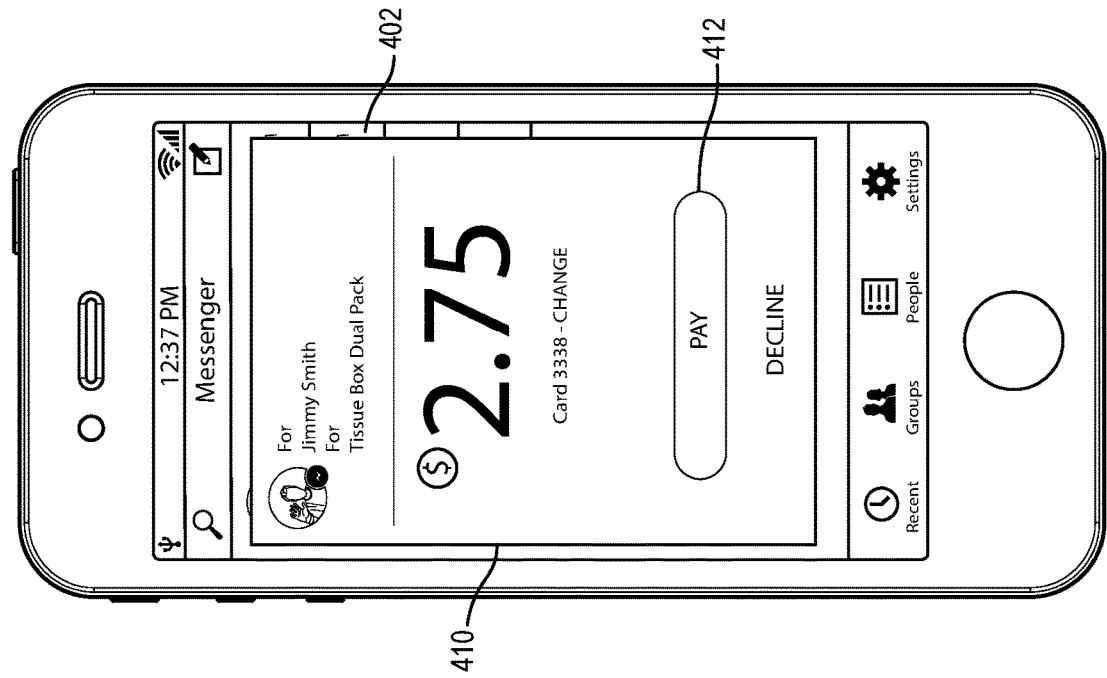
FIG. 4B illustrates a computing device with a user interface displaying a payment confirmation request message in accordance with one or more embodiments.
Figure 4A:
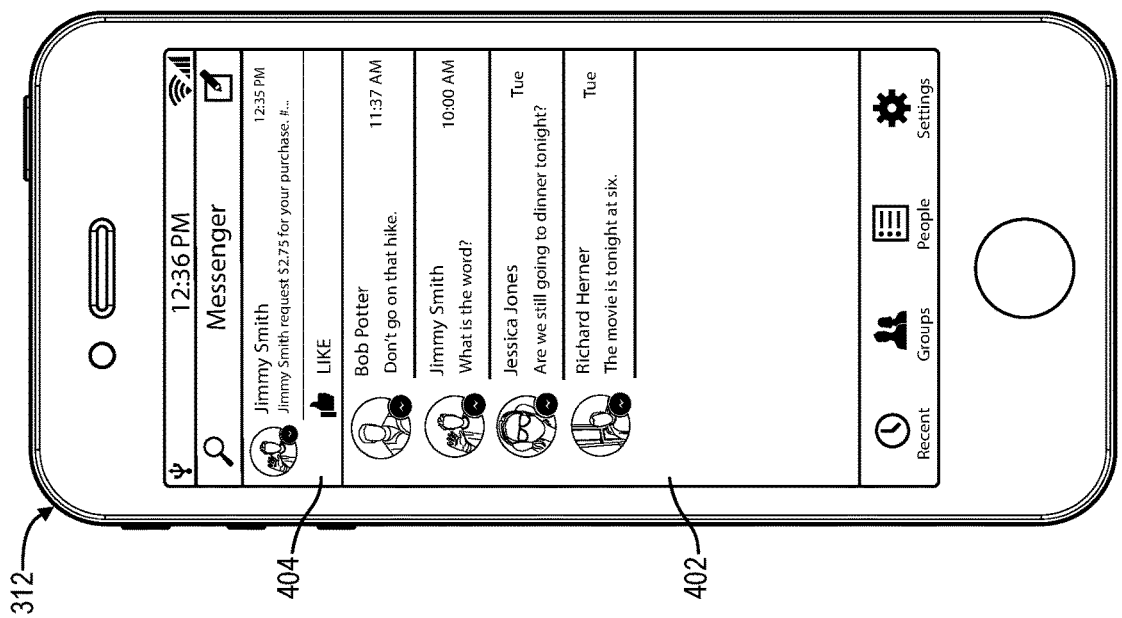
FIG. 4A illustrates a computing device with a user interface displaying a payment confirmation request notification in accordance with one or more embodiments.

FIG. 4A illustrates the computing device 312 with a user interface 402 displaying a plurality of communication threads. In particular, the user interface 402 displays a payment confirmation request notification 404. The payment confirmation request notification 404 provides an indication that the payee (i.e., "Jimmy Smith") is requesting payment from the payor (i.e., "Ryan Johnson").

Upon user interaction with the payment confirmation request notification 404, the computing device 312 can display a payment confirmation request message. For example, FIG. 4B illustrates the user interface 402 upon selection of the payment confirmation request notification 404. As shown in FIG. 4B, the user interface 402 illustrates a payment confirmation request message 410 that displays the payee, the product (i.e., "Tissue Box Dual Pack"), the payment amount ($2.75), and the payor's payment credentials ("Card 3338"). The user interface 402 also includes a selectable pay element 412 and a selectable decline element 414.

Upon user interaction with the selectable decline element 414, the digital visual code payment system can cancel the payment transaction. For instance, upon user interaction with the selectable decline element 414, the digital visual code payment system can send a message to the computing device 200 indicating that the payor has rejected the payment confirmation request.

Upon user interaction with the selectable pay element 412, the digital visual code payment system requests verification credentials. For example, FIG. 4C illustrates the user interface 402 upon selection of the selectable pay element 412. In particular, the user interface 402 indicates a request for a PIN from the payor (e.g., a PIN corresponding to the user account of the social networking system and/or the financial account). In relation to the embodiment of FIG. 4C, the digital visual code payment system will only continue with the payment transaction upon entry of a correct PIN (e.g., the PIN corresponding to the user account of the social networking system and/or the payor's financial account).

Although FIG. 4C illustrates a four-digit PIN, it will be appreciated that the digital visual code payment system can utilize a variety of different verification credentials. For example, in one or more embodiments, the digital visual code payment system can utilize a different number of digits, a password, fingerprint scanning, retinal scanning, or other verification credentials.

Upon entry of verification credentials, in one or more embodiments, the digital visual code payment system sends confirmation of the payment request. Moreover, the digital visual code payment system can complete the payment transaction. In addition, the digital visual code payment system can provide an indication of the payment request and a successful payment transaction message to the computing device 312. For example, in one or more embodiments the digital visual code payment system provides messages via a digital communication application comprising a payment confirmation request message and a successful payment transaction message.

Figure 4D:
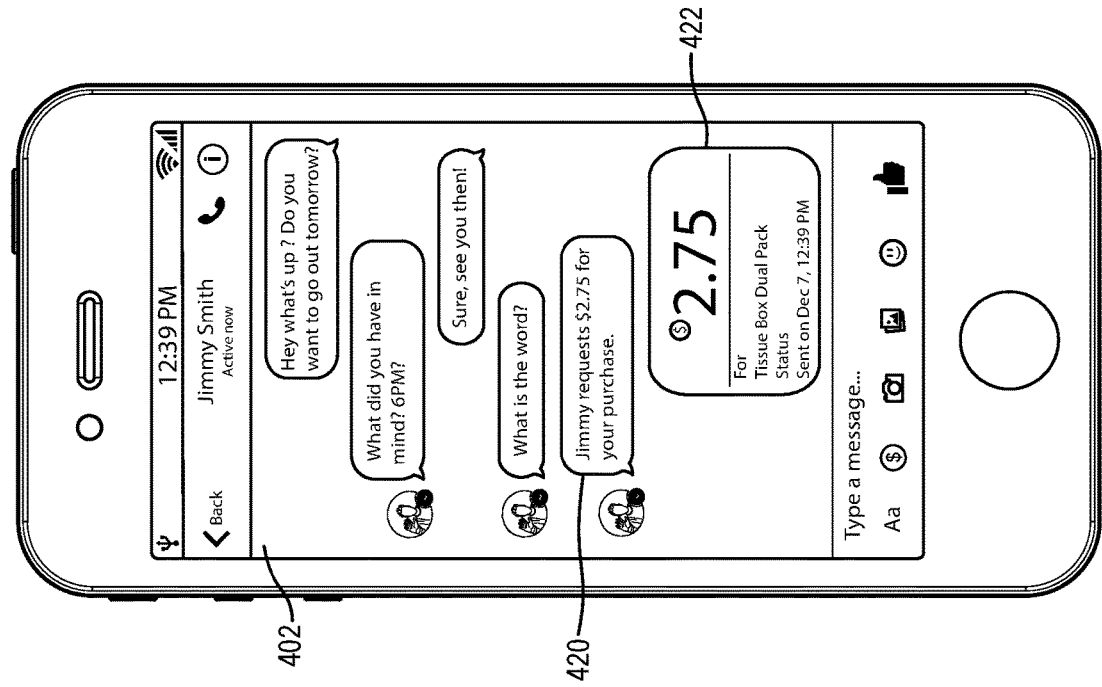
FIG. 4D illustrates a computing device with a user interface displaying a communication thread including one or more payment messages in accordance with one or more embodiments.
Figure 4C:
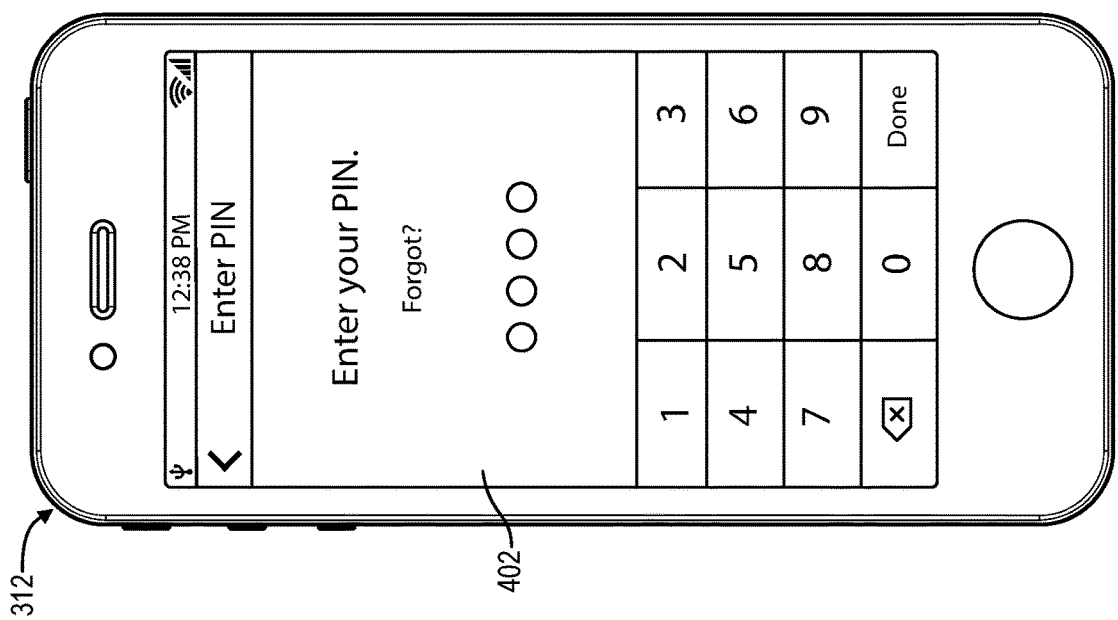
FIG. 4C illustrates a computing device with a user interface for providing verification credentials in accordance with one or more embodiments.

For example, FIG. 4D illustrates the computing device 312 after completion of a payment transaction. The user interface 402 illustrates a plurality of communications in a thread of communications between the payor (i.e., "Ryan Johnson") and the payee (i.e., "Jimmy Smith"). As shown, the digital visual code payment system provides a first message 420 that indicates the payee has requested payment. Similarly, the digital visual code payment system provides a second message 422 that indicates a successful payment transaction. Furthermore, upon user interaction with the second message 422, the digital visual code payment system can provide a more detailed transaction summary (e.g., a receipt) for display.

For example, in one or more embodiments, the digital visual code payment system can provide a receipt that indicates a payment amount provided by the payor, products or services sold, product or service cost, time and/or date of a payment transaction, and/or a payment transaction identification. Moreover, in one or more embodiments, the digital visual code payment system provides selectable product elements in the receipt. For example, in one or more embodiments, the digital visual code payment system provides selectable product elements that, when selected, allow a user to initiate an additional payment transaction with the selectable product element.

For example, consider a consumer that purchases a plurality of products from a merchant, including a reimbursable product purchased on behalf of a friend. The consumer can receive a receipt via the digital visual code payment system that includes a selectable product element corresponding to the reimbursable product. Upon selection of the selectable product element, the digital visual code payment system can initiate a transaction with the friend for the reimbursable product.

For example, the digital visual code payment system can generate a scanning user interface to allow the consumer to scan a digital visual code corresponding to the friend. Moreover, the digital visual code payment system can complete a payment transaction between the consumer and the friend for the price of the reimbursable product. In this manner, the digital visual code payment system can easily allow individuals or businesses to reimburse payments for products purchased on behalf of other individuals or businesses.

As mentioned previously, upon completion of a payment transaction, the digital visual code payment system can also provide a successful payment message to the payee (i.e., to the computing device associated with the payee). For example, FIG. 5A illustrates the computing device 200 upon completion of the payment transaction. In particular, the user interface 202 displays a plurality of communication threads with regard to the payor (i.e. "Jimmy Smith"), including a communication thread 502 with the payee (i.e., Ryan Johnson").

As shown in FIG. 5A, the communication thread 502 with the payee indicates that the payee has sent the payment amount (i.e., $2.75). Upon user interaction with the communication thread 502 with the payee, the user interface 202 can display a plurality of communications in the communication thread.

Figure 5B:
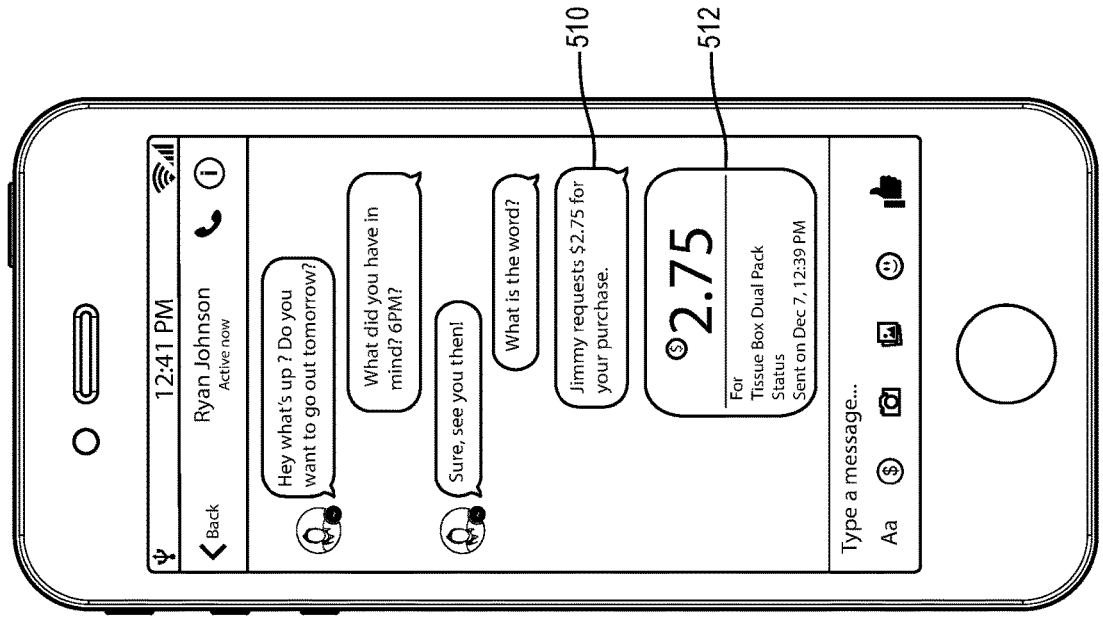
FIG. 5B illustrates a computing device with a user interface displaying a thread of digital communications in accordance with one or more embodiments.
Figure 5A:
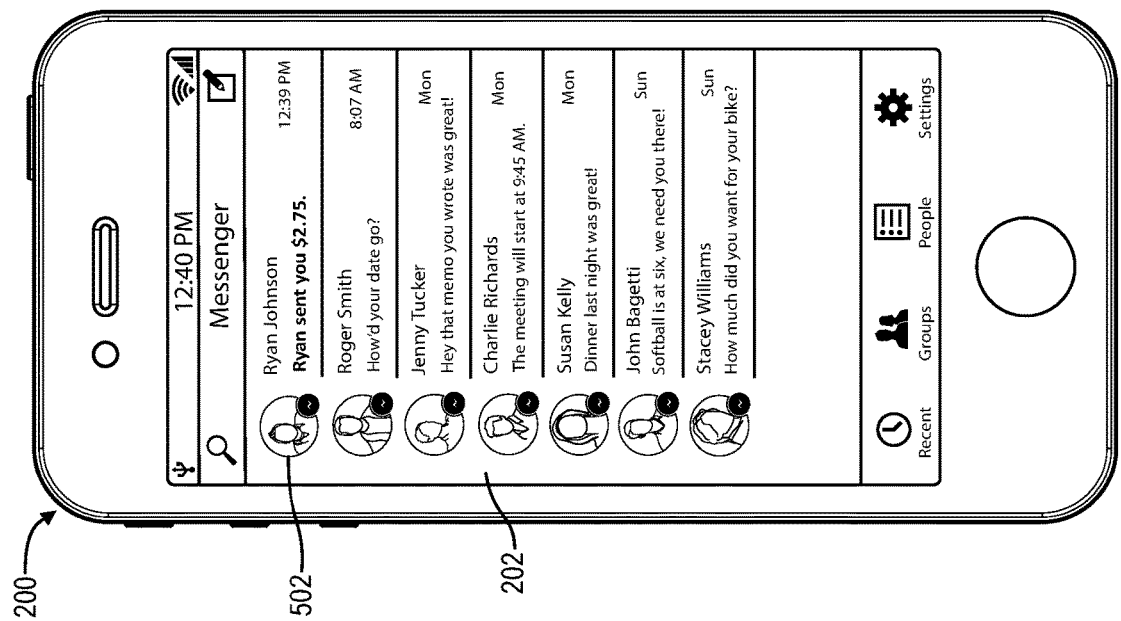
FIG. 5A illustrates a computing device with a user interface displaying a plurality of communication threads in accordance with one or more embodiments.

For example, FIG. 5B illustrates the communication thread between the payor and the payee. As shown, the communication thread includes a first message 510 indicating that the payee sent a request for the payment amount. Moreover, the second message 512 is a successful payment transaction message indicating the payment amount, the product, and the date and time payment was sent.

Figure 5C:
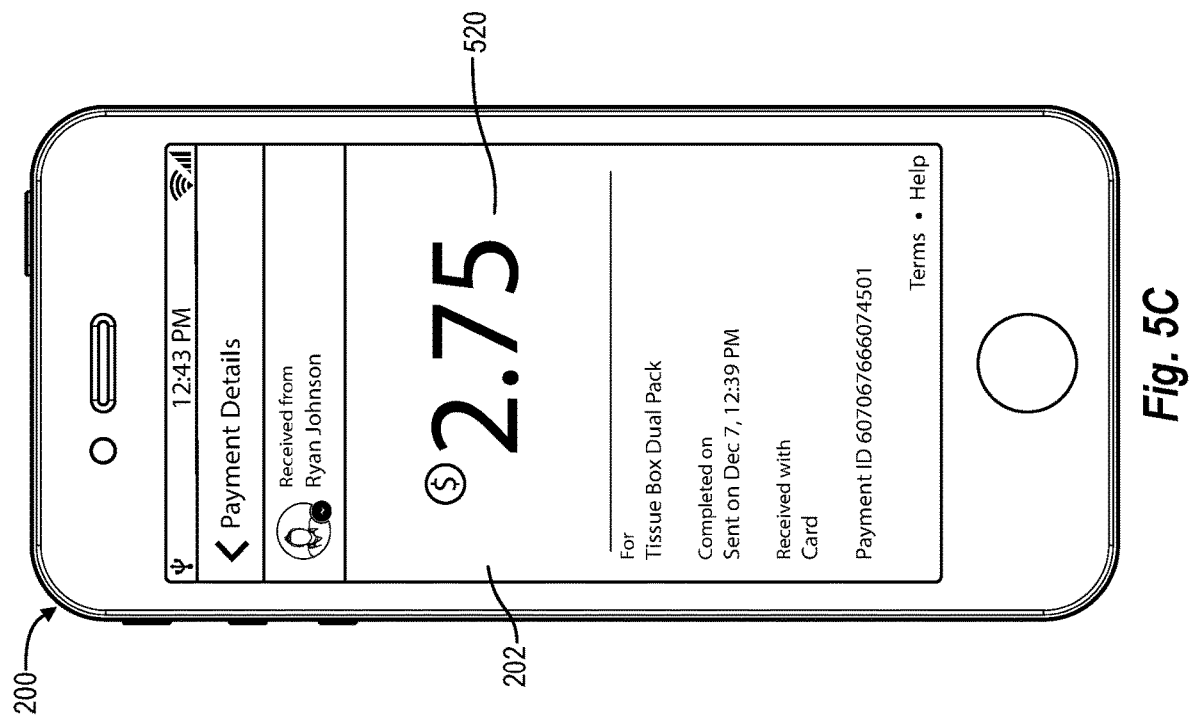
FIG. 5C illustrates a computing device with a user interface displaying a message comprising a purchase summary in accordance with one or more embodiments.

As mentioned previously, upon user interaction with the second message 512, the digital visual code payment system can provide a more detailed transaction summary, such as a receipt. FIG. 5C illustrates the user interface 202 displaying a receipt 520. As shown, the receipt 520 indicates the payor, the product, the completion date and time, the manner of payment, and a payment ID.

FIGS. 2A-5D illustrate a plurality of user interfaces that enable two individuals to transfer payments quickly and easily, without searching through lists of contacts to identify a payor or a payee, without searching for product prices, and without complex, expensive point of sale or payment processing equipment. Indeed, the payee utilizes the computing device 200 to scan product codes and the digital visual code 314. Thereafter, the digital visual code payment system automatically identifies the payor. To maintain security, the payor confirms the payment, and the digital visual code payment system completes the transaction. Moreover, both the payor and the payee conducted the entire transaction while utilizing the digital communication application 204, and without switching between a variety of supporting applications (e.g., different payment applications, scanning applications, web browsers, banking applications, etc.).

In addition, although FIGS. 2A-5C illustrate a payment transaction between two individuals, it will be appreciated that the digital visual code payment system can also complete transactions between individuals and merchants. Indeed, because the digital visual code payment system can operate from a communication application, the digital visual code payment system can minimize the gap between merchants and customers. Accordingly, the digital visual code payment system can allow merchants to provide more effective communication and more competitive services, products, and prices. Indeed, rather than simply shopping at a merchant, the digital visual code payment system allows merchants and customers to have an ongoing conversation.

Figure 6B:
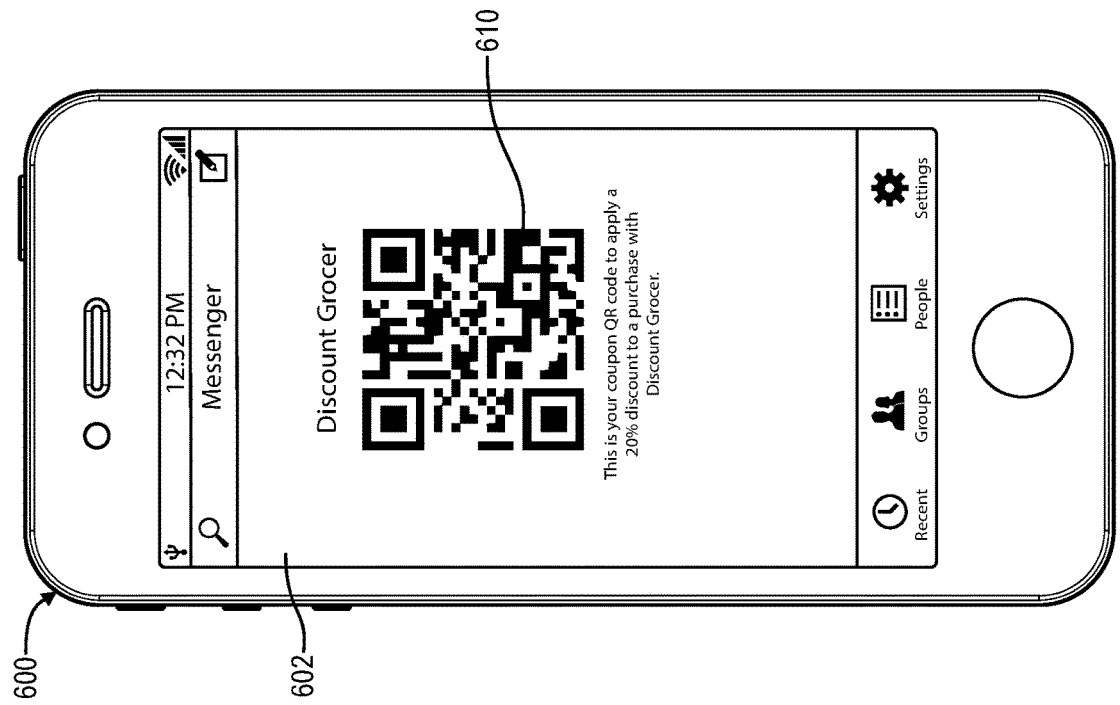
FIG. 6B illustrates a computing device with a user interface user displaying a visual code generated upon user interaction with the customer discount of FIG. 6A in accordance with one or more embodiments.
Figure 6A:
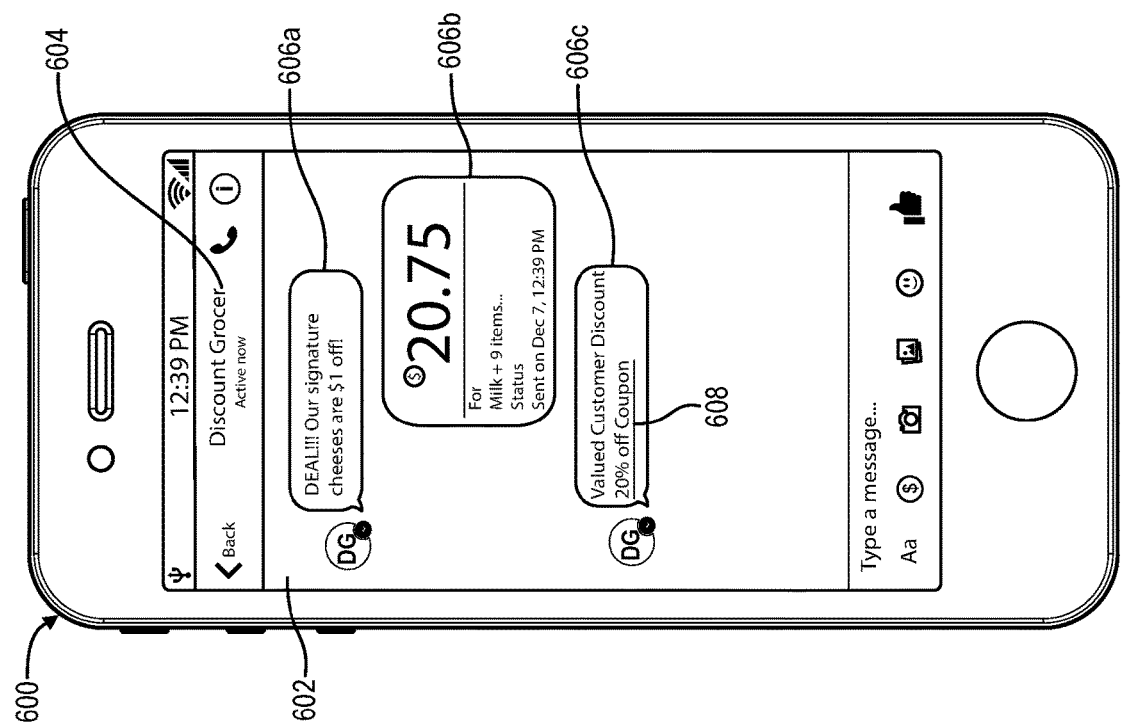
FIG. 6A illustrates a computing device with a user interface displaying a thread of digital communications including a message with a customer discount in accordance with one or more embodiments.

For example, FIG. 6A illustrates a computing device 600 with a user interface 602 associated with a digital communication application 604. Furthermore, the user interface 602 contains a communication thread between a merchant (i.e., "Discount Grocer") and a customer comprising three messages 606a-606c. As illustrated, the first message 606a includes a message informing the customer of an ongoing deal offered by the merchant for a product. The second message 606b is a successful payment transaction message indicating a previous purchase. As discussed previously, upon user interaction with the successful payment transaction message, the digital visual code payment system can provide a detailed transaction summary (i.e., a receipt). Accordingly, the digital visual code payment system can enable customers to quickly and easily review previous payments and product purchases with a merchant over time.

Moreover, the third message 606c includes a customer discount. Specifically, the third message 606c comprises a coupon for a 20% discount on products or services. Notably, the third message 606c includes a selectable link 608 in relation to the coupon. In one or more embodiments, the digital visual code payment system can generate the selectable link 608. For example, in one or more embodiments, the digital visual code payment system utilizes keywords and natural language processing techniques to identify language in communications from payees that indicate offers to consumers (e.g., a coupon). In one or more embodiments, the digital visual code payment system automatically generates the selectable link 608 upon detecting an offer to consumers.

In one or more embodiments, the digital visual code payment system generates the selectable link 608 based on user interaction with a payee. For example, a merchant can utilize a user interface to mark language reflecting an offer within a message. The digital visual code payment system can identify the mark from the merchant and insert the selectable link 608.

Upon user interaction with the selectable link 608, the digital visual code payment system can generate a digital visual code that incorporates the discount. For example, FIG. 6B illustrates the computing device 600 and the user interface 602 upon selection of the selectable link 608. In particular, the user interface 602 displays a digital visual code 610 that embeds information regarding the coupon.

Accordingly, a user of the computing device 600 can displaying the digital visual code 610 for scanning by a payee client device. Upon scanning the digital visual code 610, the payee client device can analyze the digital visual code 610 and determine both an identifier corresponding to the user of the computing device 600 and the coupon. Accordingly, the payee client device can automatically adjust a payment amount based on the coupon upon scanning the digital visual code 610 while also automatically initiating a payment transaction.

In addition to generating a digital visual code with a coupon (or other offer) based on a digital communication from a merchant to a consumer, in other embodiments, the digital visual code payment system detects and embeds other information from digital communications into a digital visual code. For example, in one or more embodiments, the digital visual code payment system detects information in a digital communication regarding a time for products or services (e.g., a pick-up time, a drop-off time, a movie time, a time duration for a service) and embeds the information in a digital visual code that can be utilized to both automatically communicate the time and provide payment. For example, a consumer can send digital communications to an automotive repair shop, child care service, or movie theater regarding a time to receive products or services. The digital visual code payment system can detect the time information from the digital communications and generate a digital visual code that incorporates the time information. Accordingly, the consumer can provide the digital visual code for scanning by the merchant, which allows the consumer to simultaneously pay and provide the time information to the repair shop (e.g., a drop-off time and a pick-up time), the child care service (e.g., a drop-off time and pick-up time), or the movie theater (e.g., a show time).

In addition to time, the digital visual code payment system can detect and embed a variety of information from digital communications between parties to a transaction. For example, in addition to time the digital visual code payment system can detect other event details, such as location, attendees, or cost. The digital visual code payment system can embed such information into a digital visual code. For example, the digital visual code payment system can determine from digital communications between a group of friends that they plan to meet for dinner. Consistent with privacy and permission settings of the users, the digital visual code payment system can generate a single digital visual code that embeds identifiers for each of the friends. Accordingly, the friends can utilize a single digital visual code to pay for the dinner (e.g., provide a single digital visual code to a restaurant for scanning, which automatically divides payment amongst the friends).

Moreover, as mentioned previously, the digital visual code payment system can also generate digital visual codes utilizing information from a social networking system. For instance, the digital visual code payment system can utilize a social networking system to identify upcoming events corresponding to a user and embed the information within digital visual codes. For example, the digital visual code payment system can access the social networking system and determine that a payor has an upcoming birthday, graduation, wedding, party, dinner, or other event. The digital visual code payment system can embed information in a digital visual code indicating that the payor has an upcoming event (i.e., without disclosing sensitive personal information such as a birth date).

For example, in one or more embodiments, the digital visual code payment system detects, from a social network, that a payor is hosting a dinner with friends. The digital visual code payment system can embed information indicating that the payor is hosting a dinner in the near future in a digital visual code. A payee computing device can scan the digital visual code and determine that the payor is hosting the dinner. In response, the payee can interact with the payor based on the additional information. For example, the payee can automatically include a coupon for dinner party supplies with a receipt. Similarly, the payee can suggest products (e.g., drinks, food, or other supplies) for the upcoming event.

In addition to events, the digital visual code payment system can include other user information from a social networking system (consistent with privacy and permission settings) in a digital visual code. For example, the digital visual code payment system can determine one or more user interests or user preferences from a digital social networking system. For example, with regard to user interests (or disinterests), the digital visual code payment system can embed information in a digital visual code indicating that the user is interested in a certain sport, a certain brand, a certain product, or some other topic, product, or service. The payee can decode and utilize the information provided in the digital visual code to further assist the payor (e.g., suggest products, offer deals, focus a shopping experience, or avoid offering certain products).

Similarly, the digital visual code payment system can determine user preferences from a social networking system and embed the user preferences in a digital visual code. For example, the digital visual code payment system can determine that a user prefers a digital receipt to a paper receipt, prefers assistance in taking products to a vehicle, prefers paper to plastic (or any other user preference) and embed the user preference in the digital visual code.

As mentioned previously, in one or more embodiments, the digital visual code payment system can also enable a payor to scan one or more product barcodes and generate a digital visual code reflecting the one or more product barcodes. Indeed, in this manner, one or more embodiments of the digital visual code payment system allow payors and payees to avoid the hassle and expense of check-out lines (e.g., by allowing the payor to generate and utilize a digital visual code to self-checkout). For example, FIGS. 7A-7B illustrate scanning product barcodes from a payor client device and generating a digital visual code that identifies the payor and the products for a fast and convenient check-out.

Figure 7B:
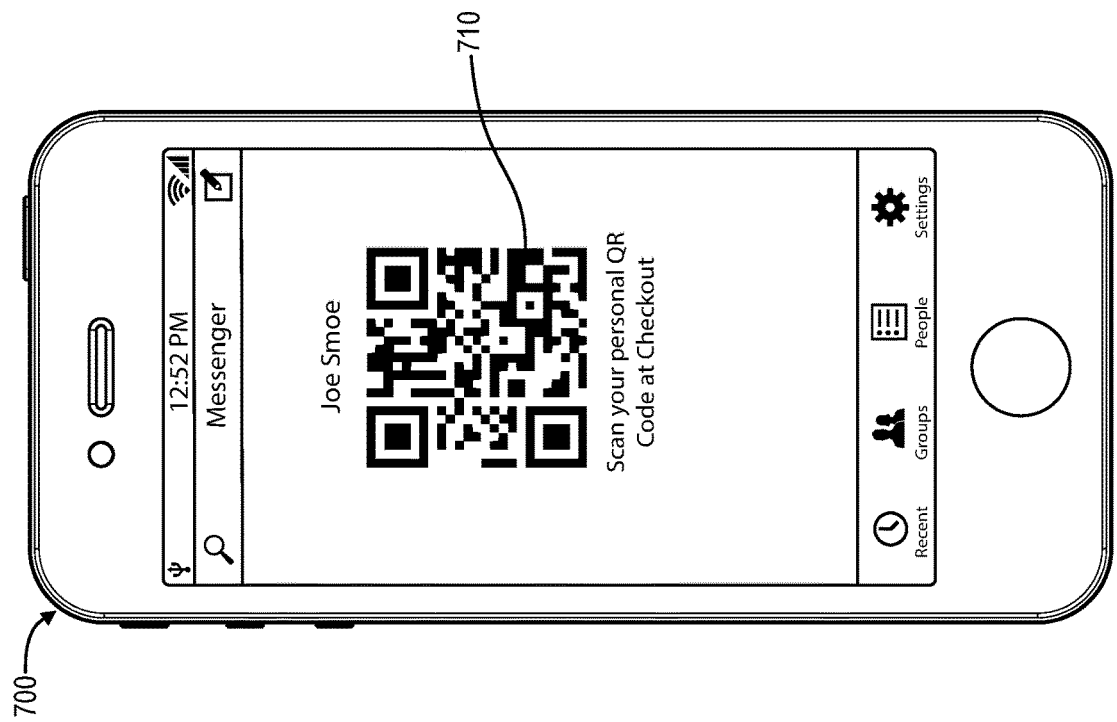
FIG. 7B illustrates a computing device of a payor with a user interface comprising a digital visual code upon scanning the product barcode of FIG. 6A in accordance with one or more embodiments.
Figure 7A:
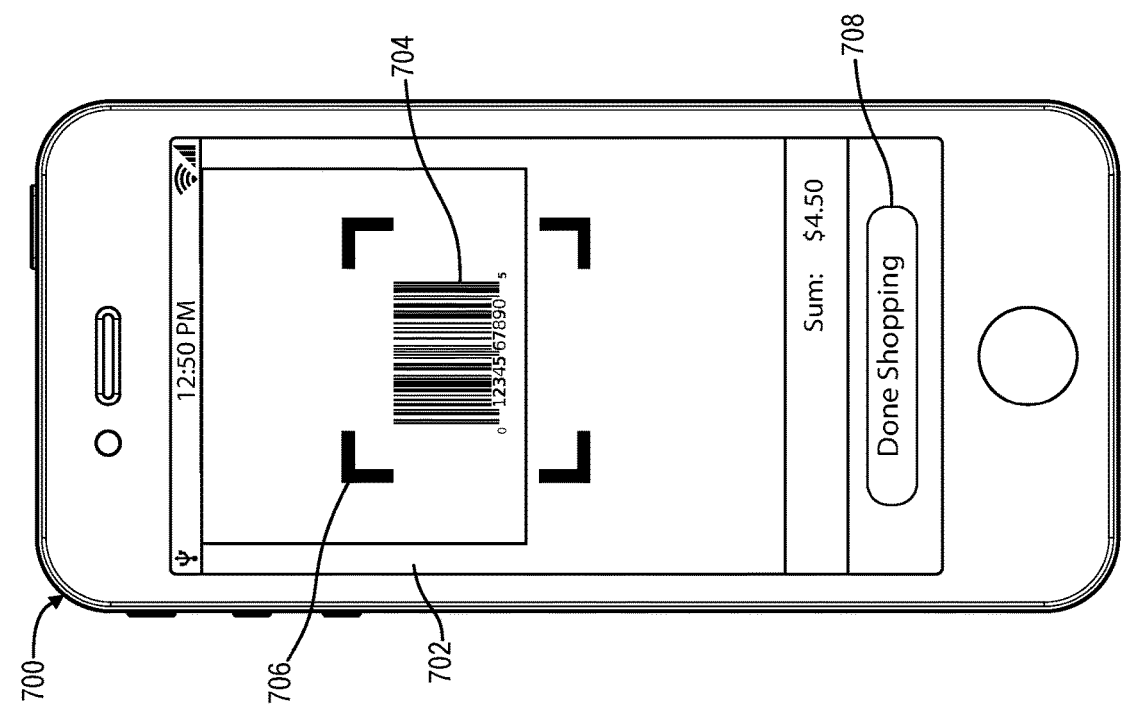
FIG. 7A illustrates a computing device of a payor with a user interface for scanning a product barcode in accordance with one or more embodiments.

In particular, FIG. 7A illustrates a payor computing device 700 with a user interface 702 for scanning product barcodes. As shown, the payor computing device 700 is aligned with a product barcode 704 such that the product barcode 704 falls within a frame 706. Accordingly, the payor computing device 700 scans the product barcode 704 and identifies a product and/or a product cost (i.e., $4.50) corresponding to the product barcode 704.

In this manner, the digital visual code payment system can enable a payor (i.e., a consumer) to scan products as they are selected (e.g., as products are taken off the shelves and placed in a shopping cart). When the payor is done shopping, the payor can interact with a conclude shopping element 708 to finish scanning products. In particular, upon user interaction with the conclude shopping element 708, the digital visual code payment system can generate (e.g., via the payor computing device 700 and/or the server device(s) 106) a digital visual code. Specifically, the digital visual code payment system can generate a digital visual code that embeds information regarding scanned products and the payor.

For example, FIG. 7B illustrates the payor computing device 700 with the user interface 702 upon selection of the conclude shopping element 708. In particular, the user interface 702 of FIG. 7B illustrates a digital visual code 710 that embeds information regarding the payor (e.g., "Joe Smoe") and selected products (e.g., the product corresponding to the product barcode 704). Accordingly, the payor can scan the digital visual code 710 (i.e., "self-checkout") utilizing a payee client device and the payee client device can automatically identify the products selected by the payor. Moreover, the payee client device can automatically initiate a payment transaction with the payor (e.g., via a social networking system associated with the payor).

Accordingly, in relation to the embodiment of FIGS. 7A-7B, a payor scans product barcodes, the digital visual code payment system generates a digital visual code, and the payor scans the digital visual codes to complete check-out and the payment transaction at the same time. Moreover, the payor can avoid waiting for a merchant to scan products and complete a payment process. In this manner, one or more embodiments of the digital visual code payment system can enable merchants to reduce or eliminate time-consuming and expensive check out lines.

It will be appreciated that although the embodiments of FIGS. 2A-7B illustrate the digital visual code payment system operating in conjunction with a digital communication system, the digital visual code payment system can also operate as a stand-alone application or in conjunction with some other application. For example, in one or more embodiments, the digital visual code payment system operates in conjunction with a social media application (e.g., FACEBOOK®). Thus, for example, a user can generate, create, receive, and/or review social media posts, comments, and messages via a social networking application (e.g., posts from a payee and/or payor) and automatically transition to a user interface for scanning digital visual codes and completing a payment transaction. For example, a consumer can see an advertisement from a merchant on a social networking application and select the advertisement and the digital visual code payment system can generate a digital visual code embedding the product and product price from the advertisement.

Turning now to FIG. 8, additional detail will be provided regarding various components and capabilities of the digital visual code payment system in accordance with one or more embodiments. In particular, FIG. 8 illustrates an example embodiment of a digital payment system 800 (i.e., the "digital visual code payment system" described above) in accordance with one or more embodiments. As shown, the digital payment system 800 includes a payor client device 802, a payee client device 804 (collectively "client devices"), and server device(s) 806. In general, the digital payment system 800 allows a payor associated with the payor client device 802 to engage a payment transaction with a payee associated with the payee client device 804.

As shown, the digital payment system 800 includes various components on the payor client device 802 (e.g., the payor client device 102), the payee client device 804 (e.g., the payee client device 104), and the server device(s) 806 (e.g., the server device(s) 106). For example, FIG. 8 illustrates that the client devices 802, 804 each include a client application 802a, 804a (e.g., a digital messaging application or a social networking application) with various components and a scanning device 810. Moreover, the server device(s) 806 include a network application 806a and a payment engine 812 with various components.

A payment network 808 (e.g., the payment network 108) is illustrated in relation to FIG. 8 as a component or system separate from the digital payment system 800, though other embodiments of the digital payment system 800 may include some or all of the components/functionality of the payment network 808. The components of the digital payment system work together to allow users to send payments, as described in greater detail below.

As shown in FIG. 8, the client applications 802a, 804a include a user interface manager 814, a user input detector 816, a message handler 818, a message analyzer 820, a digital visual code manager 822, a payment request generator 824, and a data manager 826. Moreover, FIG. 8 illustrates that the network application 806a includes a communication manager 830, a status manager 832, a message database 834, a user profile database 836, a digital visual code engine 838, and a risk calculator 840. As described below, the network application 806a can also include a social graph 850, which includes node information 852 and edge information 854. FIG. 8 further illustrates that the payment engine 812 includes a payment manager 842, a transaction database 844, and an account manager 846.

Each of the components of the payor client device 802, the payee client device 804, and the server device(s) 806 can communicate with each other or with components of the payment network 808 using any suitable communication technologies. It will be recognized that although the components of the client devices 802, 804 and the server device(s) 806 are shown to be separate in FIG. 8, any of the components may be combined into fewer components, such as into a single facility or module, or divided into more components as may serve a particular embodiment. While FIG. 8 describes certain components as part of the client applications 802a, 804a and other components as part of the network application 806a, the present disclosure is not so limited. In alternative embodiments, one or more of the components shown as part of the client applications 802a, 804a can be part of the network application 806a or vice versa. Similarly, one or more components shown as part of the network application 806a can be part of the payment engine 812 or vice versa.

The components can include software, hardware, or both. For example, the components can include computer instructions stored on a non-transitory computer-readable storage medium and executable by at least one processor of the client devices 802, 804 or the server device(s) 806. When executed by the at least one processor, the computer-executable instructions can cause the client devices 802, 804 or the server device(s) 806 to perform the methods and processes described herein. Alternatively, the components can include hardware, such as a special purpose processing device to perform a certain function or group of functions. Additionally or alternatively, the components can include a combination of computer-executable instructions and hardware.

In one or more embodiments, the client applications 802a, 804a on both the payor client device 802 and the payee client device 804 are native applications installed on the client devices 802, 804. For example, the client applications 802a, 804a on one or both client devices 802, 804 may be a mobile application that installs and runs on a mobile device, such as a smartphone or a tablet. Alternatively, the one or more both of the client applications 802a, 804a may be a desktop application, widget, or other form of a native computer program that runs on a desktop device or laptop device. Alternatively, the client applications 802a, 804a may be a remote application, such as a web application executed within a web browser, that the client devices 802, 804 access.

As mentioned, the client applications 802a, 804a on the payor client device 802 and the payee client device 804 can include the user interface manager 814. The user interface manager 814 provides, manages, and/or controls a user interface (e.g., the user interfaces 202, 402, 602, 702) that allows a payor and/or a payee to view payment transactions, view goods or services associated with a purchase, scan product barcodes, scan digital visual codes, interact with other users by sending/receiving messages, interact with payees, interact with payors, and/or initiate a payment transaction. For example, the user interface manager 814 can provide a user interface that facilitates the composition of instant messages, social networking posts, or other content. Similarly, the user interface manager 814 can provide a user interface that facilitates the selection of payors, selection of financial accounts for processing payment transactions, or sending messages to users.

More specifically, the user interface manager 814 facilitates the display of a user interface (e.g., by way of a display device associated with the corresponding client device). For example, the user interface may be composed of a plurality of graphical components, objects, and/or elements that allow a user to compose, send and receive messages or payments. More particularly, the user interface manager 814 may direct the corresponding client device to display a group of graphical components, objects and/or elements that enable a user to view a messaging thread.

As further illustrated in FIG. 8, the client applications 802a, 804a can include the user input detector 816. In one or more embodiments, the user input detector 816 can detect, receive, and/or facilitate user input. In some examples, the user input detector 816 can detect one or more user interactions with respect to the user interface. As referred to herein, a "user interaction" refers to conduct or action performed by a user (or a lack of conduct or action performed by a user) to control the function of a computing device. "User input," as used herein, refers to input data generated in response to a user interaction.

For example, the user input detector 816 can detect a user interaction from a keyboard, mouse, touch pad, touchscreen, and/or any other input device. In the event the client devices 802, 804 include a touchscreen, the user input detector 816 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The client applications 802a, 804a can perform one or more functions in response to the user input detector 816 detecting user input and/or receiving other data. Generally, a payor or payee can control, navigate within, and otherwise use the client application by providing one or more user interactions that the user input detector 816 can detect.

As further illustrated in FIG. 8, the client applications 802a, 804a include a message handler 818 that manages messages provided to or sent from the client application. For example, the message handler 818 can interact with the user interface manager 814 and the user input detector 816 to coordinate the sending and receiving of payment requests using the client application. The message handler 818 may direct the sending and receiving of content (e.g., coupons), payment information messages, payment requests, authorization messages, communication messages, or other messages to and from the network application 806a, the payment engine 812, and/or the payment network 808 over the course of an electronic payment transaction between a payor and a payee. The message handler 818 may organize incoming and outgoing messages and direct the user interface manager 814 to display messages, such as payment confirmation requests or push notifications.

The client applications 802a, 804a further includes the message analyzer 820. The message analyzer 820 can analyze messages sent from and received by the client application for events or attachments. For example, the message analyzer 820 identifies coupons, deals, events, or other content attached to messages from the network application 806a in relation to payment requests. For instance, when the payee client device 804 sends coupon to the payor client device 802 (via the network application 806a), the message analyzer 820 analyzes the message and extracts the coupon from the messages.

As illustrated in FIG. 8, the client applications 802a, 804a further include the digital visual code manager 822. The digital visual code manager 822 can create, generate, provide for display, scan, identify, decode, interpret, and/or process digital visual codes. For example, as discussed previously, the digital visual code manager 822 can process a digital visual code captured by a scanning device (e.g., the scanning device 810). In particular, the digital visual code manager 822 can process a digital visual code and identify data embedded in the digital visual code, such as an identifier of a payor, product information, product cost information, coupons, user preferences, user interest, and/or other user information.

As mentioned previously, the digital visual code manager 822 can also create a digital visual code. For example, the digital visual code manager 822 can receive an identifier of a payor (e.g., from the digital visual code engine 838) and generate a digital visual code reflecting the identifier. The digital visual code manager 822 can also generate digital visual codes that reflect other information, such as selected products, user information, and/or coupons. The digital visual code manager 822 can also generate digital visual codes that reflect information regarding multiple users (e.g., multiple payors).

As shown in FIG. 8, the client applications 802a, 804a also include the payment request generator 824 to create payment requests (e.g., payment information messages) corresponding to payment transactions. For example, the payment request generator 824 can generate a data package that includes payment data such as a payment amount, a digital visual code, a payor identifier, and/or a payee identifier. Additionally, the payment data can include account information for the payee, authorization information, currency information, and other data that may be helpful to facilitate a payment from the user to the merchant. As described previously, the payment request may include only some of the payment transaction information, and the payment request generator 824 may create one or more additional payment requests to provide more payment data.

The client applications 802a, 804a also include the data manager 826 to maintain message data representative of data used in connection with composing, sending, and receiving messages or data between a payor and/or payee. For example, data can include message logs, contact lists, content, past communications, past payment transactions, digital visual codes, and other similar types of data that the client applications 802a, 804a can use in connection with providing the ability for the payee and payor to engage in payment transactions.

As illustrated in FIG. 8, the client devices 802, 804 can also include the scanning device 810. The scanning device 810 can identify, capture, scan, and analyze one or more codes. For example, the scanning device 810 can capture a barcode and/or digital visual code. In particular, the scanning device 810 can scan a digital visual code provided for display via another client device. Similarly, the scanning device 810 can provide an image feed for display (e.g., via the user interface manager 814) such that a user of the client devices 802, 804 can identify a code for scanning.

As mentioned above, either of the client devices 802, 804 can scan product barcodes. For example, the payor client device 802 can scan product barcodes and generate (via the digital visual code manager 822) a digital visual code corresponding to the products. Similarly, the payee client device 804 can scan product barcodes, scan a digital visual image from the payor client device 802, and send a payment request to the server device(s) 806.

As briefly mentioned above, in addition to the client devices 802, 804, the digital payment system 800 can further include a network application 806a that is implemented in whole or in part on the server device(s) 806. In one or more embodiments of the present disclosure, the network application 806a is part of a social-networking system (such as, but not limited to FACEBOOK®), but in other embodiments the network application 806a may comprise another type of applications, including but not limited to an instant messaging application, an e-mail application, search engine application, banking application, or any number of other application types that utilizes user accounts.

As illustrated, in one or more embodiments where the network application 806a comprises a social networking system, the network application 806a may include the social graph 850 for representing and analyzing a plurality of users and concepts. Node storage of the social graph 850 can store node information 852 comprising nodes for users, nodes for concepts, nodes for transactions, and nodes for items. Edge storage of the social graph 850 can store edge information 854 comprising relationships between nodes and/or actions occurring within the social-networking system. Further detail regarding social networking systems, social graphs, edges, and nodes is presented below with respect to FIGS. 13-14.

As illustrated in FIG. 8, the communication manager 830 processes messages received from client applications 802a, 804a. For example, the communication manager 830 can interact with the message handler 818 of the client application 802a (or the client application 804a). The communication manager 830 can act as a directory for messages or data sent to and received from payors and/or payees involved in a payment transaction. The communication manager 830 may receive a payment request from the client application 804a of the payee client device 804 and identify payment data in the payment request. One will appreciate that the communication manager 830 can also allow users and/or merchants to exchange messages via the network application 806a. Additionally, the communication manager 830 can send a message for a recipient to multiple client devices associated with the recipient (i.e., each device upon which the user has installed a version of the client application).

The status manager 832 can track the status of users (e.g., payors, payees) of the client applications 802a, 804a and/or the client devices 802, 804. For example the status manager 832 can identify when a user is logged into the client application, when a user is active on the client application, or when a client device associated with a user or user account is online or active. The status manager 832 can send indications (such as push notifications) to the client application to notify the client application of the status of users, device, messages, or payments. The status manager 832 can also manage a location of users based on location data received from the client devices 802, 804. The status manager 832 can communicate with the user interface manager 814 to present status notifications to users.

The network application 806a may also include the message database 834. The message database 834 can maintain message data representative of content of messages from payors and/or payees involved in payment transactions and/or communication threads. The message database 834 may maintain status data representative of the information mentioned above that the status manager 832 tracks. The message database 834 can thus provide an archive of messaging threads, which the network application 806a can provide to a user on demand or once a user logs into the client application using a new computing device.

The network application 806a can also include the user profile database 836. The user profile database 836 manages user profiles or user accounts for a plurality of users. Specifically, when a user registers with the network application 806a (e.g., via the client application), the network application 806a creates a user account for the user. The user profile database 836 can store information about the user for maintaining and displaying in a visible user profile for the user. For example, the user profile database 836 can maintain personal information, identification information, location information, images uploaded by the user, contacts, and other information that the user provides to the network application 806a to populate the user profile.

In one or more embodiments, the user profile database 836 also associates identifiers, with digital visual codes (e.g., QR codes) and/or user accounts. For example, the user profile database 836 can comprise one or more arrays, spreadsheets, or tables that identify a user corresponding to an identifier and/or a QR code. The digital payment system 800 can utilize the user profile database 836 to identify one or more user accounts upon receiving an identifier (e.g., an encoded user identifier) from a client device.

As shown in FIG. 8, the network application 806a also includes the digital visual code engine 838. The digital visual code engine 838 can generate, create, provide, modify, alter, change, send, and/or receive one or more digital visual codes. In particular, the digital visual code engine 838 can generate digital visual codes embedding identifiers corresponding to a payor (e.g., identifiers from the user profile database 836).

For example, the digital visual code engine 838 can generate a digital visual code that embeds a username or other user identifier corresponding to a user account of a payor from the user profile database 836. Moreover, the digital visual code engine 838 can send the digital visual code to the payor client device 802. As mentioned above, the digital visual code engine 838 can generate digital visual codes that embed a variety of other types of information, such as product information, coupon information, or user information.

In one or more embodiments, the digital visual code engine 838 can generate a digital visual code by sending an identifier (e.g., from the user profile database 836) to the payor client device 802 (e.g., via the digital visual code manager 822). For example, in one or more embodiments, the digital visual code engine 838 sends an identifier (e.g., encrypted username) to the digital visual code manager 822, and the digital visual code manager 822 finalizes a digital visual code for display via the payor client device 802.

As mentioned, the digital visual code engine 838 can also modify one or more digital visual codes. For example, the digital visual code engine 838 can modify the user profile database 836 to change the digital visual code corresponding to a particular user (e.g., user account). Similarly, in one or more embodiments, the digital visual code engine 838 modifies digital visual codes by modifying identifiers utilized to create the digital visual codes (e.g., modify the identifiers stored in the user profile database 836).

In addition to the digital visual code engine 838, the network application 806a includes the risk calculator 840 to determine a risk associated with a payment transaction. Specifically, the risk calculator 840 can determine whether a payor and or payee (and/or a payment transaction) is high risk based on information associated with the payor and/or payee in order to prevent fraudulent payment transactions. For example, the risk calculator 840 can determine the likelihood of fraudulent activity based on activity or information associated with the payor and/or payee in connection with the network application 806a. Determining a risk associated with users involved in payment transactions can also be useful in determining whether to process a particular payment transaction or in determining how to treat the payment transaction. For example, the network application 806a and/or the payment engine 812 can use a calculated risk for a payor and/or payee to determine whether to process an electronic payment transaction between the payor and the payee or to require the payor to pay via other methods (e.g., a physical debit card, cash, or check).

In one or more embodiments, the risk calculator 840 can access a transaction history for the user to identify tendencies of the user. For example, the risk calculator 840 can determine that the user typically visits a merchant on the same day every week, purchases the same goods or services at a merchant, or is involved in other payment transactions on a regular basis. The risk calculator 840 can then assess a risk for the user for a particular payment transaction based on the user's purchasing habits.

To illustrate, and as discussed previously, if the user buys a cup of coffee from a merchant every day at approximately the same time, the risk calculator 840 can determine that the risk for a give payment transaction is low. The digital payment system 800 can then determine how to authorize a payment transaction based on the low risk. For example, the digital payment system 800 can waive an authorization request from the user for processing a payment transaction based on a low risk for the given payment transaction. Alternatively, the digital payment system 800 can authorize the payment transaction based on a verification of the user's identity from the merchant.

According to one or more embodiments, the digital payment system 800 can maintain the payment engine 812 separate from the network application 806a. For example, the digital payment system 800 can implement payment processes associated with the payment engine 812 separately from at least some of the functionality of the network application 806a. To illustrate, the digital payment system 800 can implement the functionality of the payment engine 812 on a first group of one or more servers and the functionality of the network application 806a on a second group of one or more servers. Implementing functionality of the payment engine 812 and the network application 806a on separate servers can allow the digital payment system 800 to ensure that at least some of the financial information associated with the users is maintained apart from the network application 806a to comply with Payment Card Industry (PCI) standards. Alternative configurations of servers and/or software than those described herein may also allow the digital payment system 800 to comply with PCI standards.

As mentioned previously, the server device(s) 806 can include the payment engine 812 having the payment manager 842. The payment manager 842 can integrate the sending and receiving of payment requests and initiate payment transactions, and may employ one or more application programming interfaces (APIs). For example, upon the communication manager 830 receiving a payment request, the communication manager 830 can send any payment details to the payment manager 842. The payment manager 842 can then use the payment details retrieved from the payment request to initiate a payment transaction using the payment network 808.

The payment manager 842 can coordinate a transaction corresponding to a payment defined in a payment request. As generally explained above, the payment manager 842 can coordinate a transaction via the payment network 808 that corresponds to a payment request, monitor the status of the transaction, and provide status information regarding the transaction. More specifically, the payment network 808 can authorize a transaction, fund a transaction, and/or settle an individual transaction or batch of transactions. In one or more embodiments, the payment manager 842 can use one or more application programming interfaces (API) to communicate relevant information with the payment network 808.

To complete a transaction, the payment manager 842 can access or obtain payment credentials for the consumer and the merchant. Specifically, the payment manager 842 identifies a payment credential (e.g., a payment authorization number or a payment token) for the user in connection with a financial account for the user. For example, the payment manager 842 can communicate with the user profile database 836 to identify a financial account associated with a user account for the user. Additionally, the payment manager 842 can communicate with the communication manager 830 to send a plurality of possible financial accounts to the payor client device 802 for selecting one of the possible financial accounts to use in the payment transaction.

The transaction database 844 of FIG. 8 can provide storage for a transaction history for users and merchants. For example, the transaction database 844 can store each transaction (such as in the form of a graph object), attempted or completed, transaction IDs, a date, an amount of the transaction, the payment method used, a payor identifier, a payee identifier, and any other information gathered on the transaction. With this information, the payment manager 842 can provide, upon request, a summary of one or more transactions to users as a history of payments requested, payments declined and payments completed.

Additionally, the payment engine 812 includes the account manager 846 for managing payment credentials of users and merchants in connection with financial accounts of the users/merchants. Specifically, a user or merchant can register a financial account or a payment receipt with the account manager 846. The account manager 846 can store the details about the financial accounts of the users and merchants who have user accounts in the user profile database 836. The account manager 846 can also store linking information that links the financial accounts to the respective user accounts. In one or more embodiments, the account manager 846 also stores additional information associated with the payment credentials, such as expiration dates, security codes, address information, and/or other information.

Figure 9:
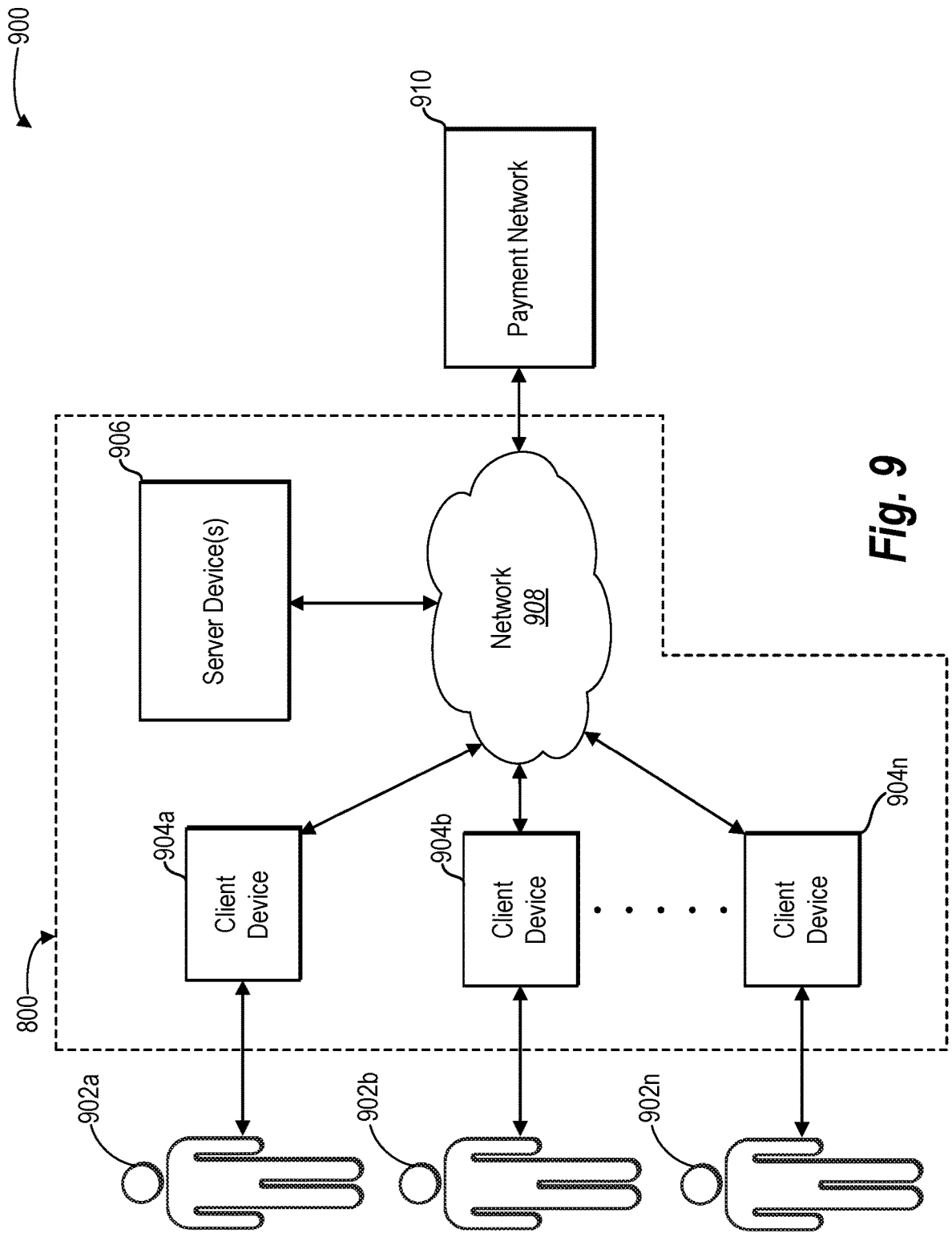
FIG. 9 illustrates a schematic diagram of a network environment in which the methods and systems disclosed herein may be implemented in accordance with one or more embodiments.

Turning now to FIG. 9, further information will be provided regarding implementation of the digital payment system 800. Specifically, FIG. 9 illustrates a schematic diagram of one embodiment of an exemplary system environment ("environment") 900 in which the digital payment system 800 can operate. As illustrated in FIG. 9, the digital payment system 800 allows users 902a-902n to interact (e.g., engage in electronic payment transactions and/or digital communications) using client devices 904a-904n. In particular, as illustrated, the environment 900 can include the client device 904a-904n (e.g., the client devices 802, 804), server(s) 906 (e.g., the server device(s) 806), a network 908, and a payment network 910 (e.g., the payment network 808). As shown, the client devices 904a-904n, the server(s) 906, and the payment network 910 may be communicatively coupled with each other either directly or indirectly (e.g., through the network 908).

As illustrated in FIG. 9, the environment 900 can include the users 902a-902n. The users 902a-902n can comprise any individual, group, business, government, or entity. For example, in one or more embodiments, the user 902a is an individual payor seeking to provide a payment to the user 902b (e.g., a merchant). In other embodiments, the user 902a and the user 902b are both payors seeking to provide a payment to the user 902n (e.g., a friend of the users 902a, 902b). It will be appreciated that although FIG. 9 illustrates three users 902a-902n operating three client devices 904a-904n, the environment 900 can include a greater or fewer number of users and/or client devices.

As mentioned, the digital visual code digital payment system 800 enables the users 902a-902n to engage in payment transactions and/or communications utilizing the client devices 904a-904n. The client devices 904a-904n may comprise any type of computing device. For example, the client devices 904a-904n may comprise one or more personal computers, laptop computers, mobile devices, mobile phones, tablets, special purpose computers, or other computing devices, as described in greater detail below in relation to FIG. 12. In one or more embodiments, the computing devices 904a-904n comprise computing devices operably connected to an imaging (e.g., scanning) device.

As illustrated in FIG. 9, the environment 900 also includes the server(s) 906. The server(s) 906 may generate, store, receive, and/or transmit any type of data, including electronic communications, e-mails, social networking posts, instant messages, text messages, tags, comments, payment messages, payment transaction data, or any other data. For example, the server(s) 906 may receive data from the client device 904a and send the data to the client device 904b and/or the payment network 910. In one example, server(s) 906 can also host a social network. In one or more embodiments, the server(s) 906 may comprise a data server, a communication server, or a web-hosting server.

As illustrated in FIG. 9, the client devices 904a-904n, the server(s) 906, and/or the payment network 910 may communicate via the network 908. In one or more embodiments, the network 908 includes the Internet or World Wide Web. The network 908, however, can include one or more private and/or public networks that use various communication technologies and protocols, as further described below with reference to FIG. 12.

As illustrated, the digital payment system 800 can include the payment network 910 communicatively coupled with the server(s) 906 and/or the client devices 904a-904n via the network 908. The payment network 910 can transfer funds between financial accounts associated with the users 902a-902n.

Although FIG. 9 illustrates a particular arrangement of the users 902a-902n, the client devices 904a-904n, the server(s) 906, the network 908, and the payment network 910, various additional arrangements are possible. For example, the client devices 904a-904n may directly communicate with the server(s) 906 or the payment network 910, bypassing the network 908.

The components of the environment 900 can operate jointly or in isolation to facilitate a payment transaction utilizing one or more digital visual codes. By way of example, in one or more embodiments, the user 902a is a consumer shopping at a brick-and-mortar store of the user 902b (i.e., a merchant in this example). The user 902a selects products for purchase and provides the products to the merchant 902b. For instance, in one or more embodiments, the merchant 902b scans product codes utilizing the client device 904b.

Moreover, the client device 904a displays a digital visual code identifying the user 902a. The merchant 902b scans the digital visual code utilizing the client device 904b, and the client device 904b transmits an indicator of the user 902a to the server(s) 906. The server(s) 906 utilize the indicator of the user 902a to identify an account corresponding to the user 902a and utilize a social networking system to determine risk associated with the requested transaction. Upon determining that the payment transaction falls within an acceptable risk threshold, the server(s) 906 send the user 902a a payment confirmation request via the client device 904b. The user 902a utilizes the client device 904b to confirm the payment and send a payment confirmation message to the server(s) 906. Upon receiving the payment confirmation, the server(s) 906 can communicate with the payment network 910 to complete the payment transaction and transfer funds from an account of the user 902a to the merchant 902b.

In addition, as mentioned previously, in one or more embodiments, the server(s) 906 also generate and/or modify digital visual codes (or identifiers utilized to create digital visual codes). For example, in one or more embodiments, the server(s) 906 generate and transmit a digital visual code (or identifier) to the client device 904a. The user 902a can utilize the client device 904a to share the digital visual code and complete a payment transaction with the digital visual code. Moreover, the server(s) 906 can periodically generate a modified digital visual code (or modified identifier) and send the modified digital visual code (or modified identifier) to the client device 904a for use in additional transactions.

As illustrated in FIG. 9, in one or more embodiments, the digital payment system 800 is implemented in whole, or in part, by the client devices 904a-904n and the server(s) 906. Indeed, the client devices 904a-904n and the server(s) 906 can generate and identify one or more digital visual codes and utilize the digital visual codes to complete payment transactions between the users 902a-902n.

However, the digital visual code digital payment system 800 may be implemented in whole, or in part, by any of the individual elements 904a-910 of the environment 900. Indeed, although FIG. 9 (and the previous examples), describe certain components or processes of the digital visual code digital payment system 800 implemented with regard to certain components of the environment 900, it will be appreciated that components of the digital payment system 800 can be implemented in any of the components of the environment 900.

Figure 10:
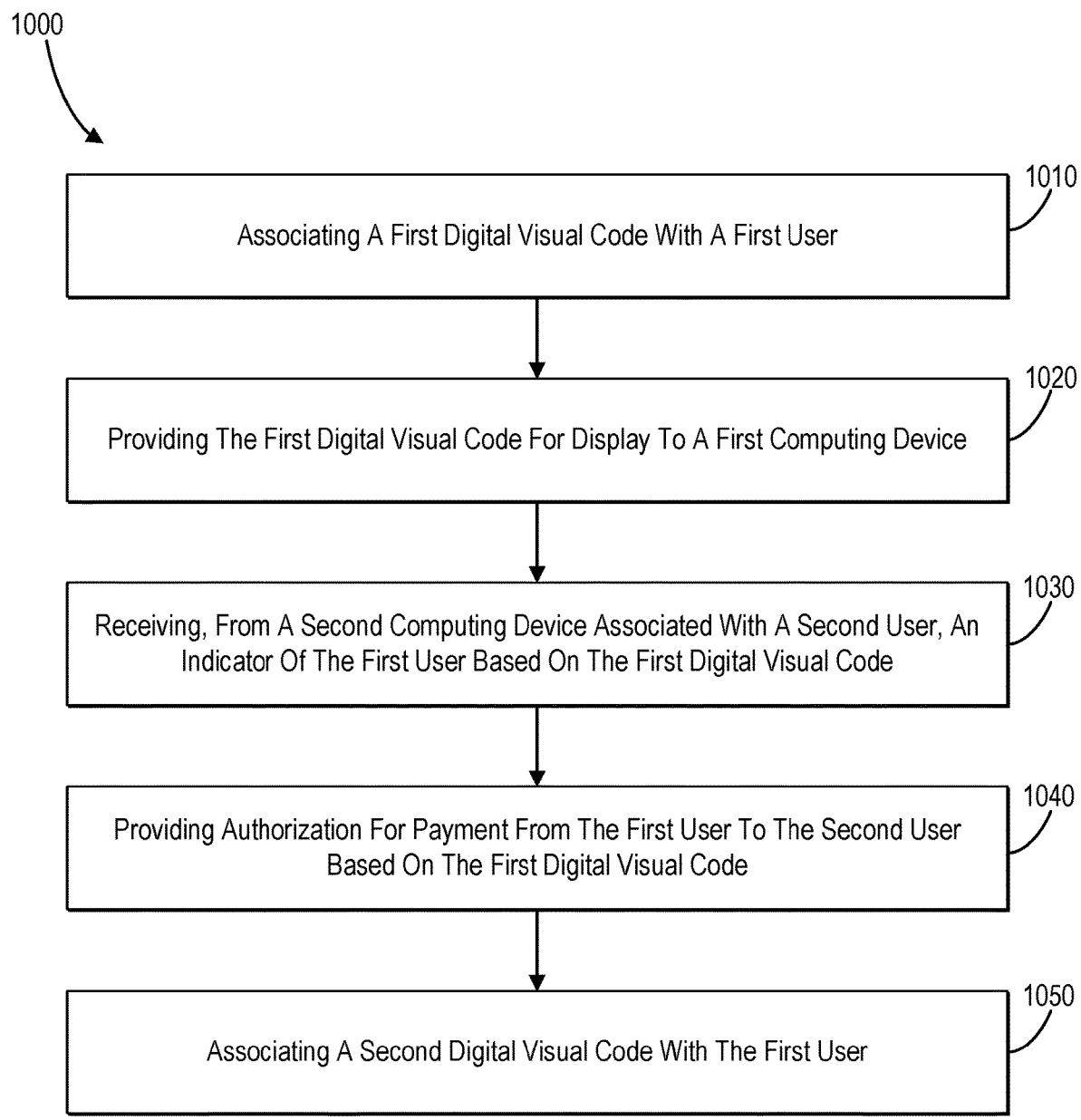
FIG. 10 illustrates a flow chart of a method of facilitating payments in accordance with one or more embodiments.
Figure 11:
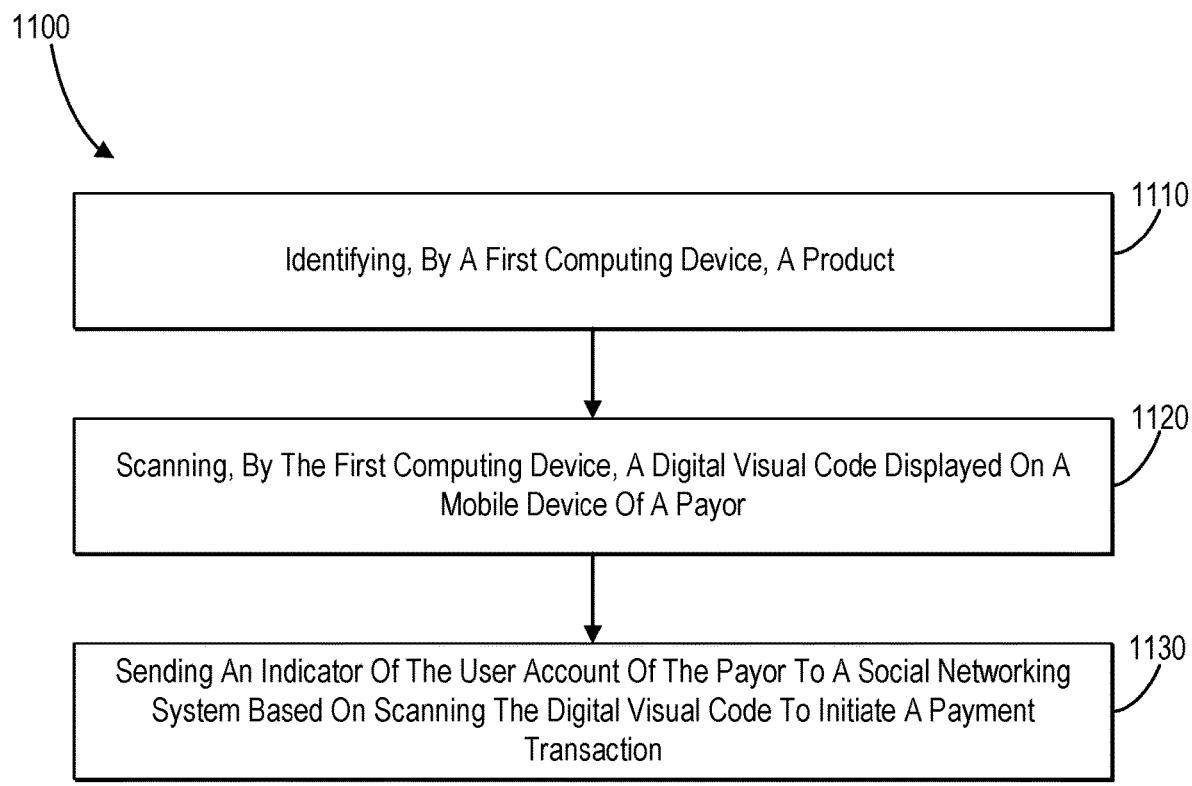
FIG. 11 illustrates another flow chart of a method of facilitating payments in accordance with one or more embodiments.

FIGS. 1A-9, the corresponding text, and the examples, provide a number of different systems and devices for generating and utilizing digital visual codes in electronic payment transactions. In addition to the foregoing, embodiments can also be described in terms of flowcharts comprising acts and steps in a method for accomplishing a particular result. For example, FIGS. 10-11 illustrate flowcharts of exemplary methods in accordance with one or more embodiments of the present invention. The methods described in relation to FIGS. 10-11 may be performed with less or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart of a series of acts in a method 1000 of utilizing digital visual codes in accordance with one or more embodiments of the present invention. In one or more embodiments, the method 1000 is performed in a digital medium environment that includes the digital payment system 800. The digital payment system 800 may provide a system that allows a user to create one or more digital events based on text of one or more electronic communications. The method 1000 is intended to be illustrative of one or more methods in accordance with the present disclosure, and is not intended to limit potential embodiments. Alternative embodiments can include additional, fewer, or different steps than those articulated in FIG. 10.

As shown in FIG. 10, the method 1000 includes an act 1010 of associating a first digital visual code with a first user. In particular, the act 1010 can include associating a plurality of digital visual codes with a corresponding plurality of users, the plurality of digital visual codes comprising a first digital visual code associated with a first user. For example, as discussed previously, in one or more embodiments the act 1010 includes associating an indicator with a first user. Moreover, the act 1010 can also comprise generating the first digital visual code by embedding data regarding the first user's interests in the first digital code from a social networking system, such that upon scanning the first digital visual code, the data regarding the first user's interests is provided.

As shown in FIG. 10, the method 1000 also includes the act 1020 of providing the first digital visual code for display to a first computing device. In particular, the act 1020 can include providing, by at least one processor, the first digital visual code for display to a first computing device corresponding to the first user. For example, as mentioned previously, in one or more embodiments the act 1020 includes providing the indicator to the first computing device to generate the first digital visual code.

As illustrated in FIG. 10, the method 1000 also includes the act 1030 of receiving, from a second computing device associated with a second user, an indicator of the first user based on the first digital visual code. In particular, the act 1030 can include receiving, from a second computing device associated with a second user, an indicator of the first user and a payment amount, the indicator of the first user obtained by the second computing device by scanning the first digital visual code displayed on the first computing device. For example, in one or more embodiments, the act 1030 comprises receiving a username or other user identifier of the first user corresponding to a social networking system.

In addition, as shown in FIG. 10, the method 1000 also includes the act 1040 of providing authorization for payment from the first user to the second user based on the first digital visual code. In particular, the act 1040 can include, in response to identifying the first user based on the received indicator and the database, providing authorization for payment, by the at least one processor and a payment network, from the first user to the second user. For example, in one or more embodiments, the act 1040 comprises maintaining a social networking system comprising a plurality of users; defining a subset of authorized users of the plurality of users of the social networking system that can utilize the first digital visual code associated with the first user; and determining that the subset of users comprises the second user.

As shown in FIG. 10, the method 1000 also includes the act 1050 of associating a second digital visual code with the first user. In particular, the act 1050 can include generating a second digital visual code and associating the second digital visual code with the first user in place of the first digital visual code such that the first digital visual code is not operable to authorize payments from the first user. For example, in one or more embodiments, the act 1050 includes associating a second indicator with the first user. Moreover, the act 1050 can include generating the second digital visual code and associating the second digital visual code with the first user in place of the first digital visual code in response to receiving the indicator of the first user or in response to expiration of a time period.

In addition, the method 1000 can also include in response to identifying the first user based on the received indicator, sending a confirmation request to the first computing device associated with the first user; and providing authorization for the payment upon receiving a confirmation from the first computing device.

Furthermore, the method 1000 can also include providing the second digital visual code for display to the first computing device corresponding to the first user; receiving, from a third computing device associated with a third user, a second indicator of the first user and a payment amount, the second indicator of the first user obtained by the third computing device by scanning the second digital visual code displayed on the first computing device; and in response to identifying the first user based on the received indicator, providing authorization for payment, via the payment network, from the first user to the third user.

In addition, FIG. 11 illustrates a flowchart in another series of acts in a method 1100 of utilizing digital visual codes. As shown in FIG. 11, the method 1100 includes an act 1110 of identifying, by a first computing device, a product. In particular, the act 1110 can include identifying, by a first computing device, a product and a product cost. For example, in one or more embodiments, the first computing device is a smartphone, and the act 1110 comprises scanning by the first computing device, a product barcode corresponding to the product. In addition, in one or more embodiments, the act 1110 comprises scanning the digital visual code displayed on the second computing device of the payor, wherein the digital visual code is generated based on the second computing device scanning a product barcode associated with the product.

As illustrated in FIG. 11, the method 1100 also includes the act 1120 of scanning, by the first computing device, a digital visual code displayed on a mobile device of a payor. In particular, the act 1120 can include scanning, by the first computing device, a digital visual code displayed on a mobile device of a payor, wherein the digital visual code is generated by a social networking system via a remote server and the digital visual code comprises information identifying a user account of the payor with the social networking system.

As shown in FIG. 11, the method 1100 also includes the act 1130 of sending an indicator of the user account of the payor to a social networking system based on scanning the digital visual code to initiate a payment transaction. In particular, the act 1130 can include sending an indicator of the user account of the payor to the social networking system based on scanning the digital visual code to initiate a payment transaction via the social networking system. For example, in one or more embodiments, the digital visual code embeds information identifying a plurality of user accounts of a plurality of payors and the act 1130 comprises sending an indicator of the plurality of user accounts of the plurality of payors based on scanning the digital visual code to initiate the payment transaction via the social networking system with the plurality of payors.

In addition, the method 1100 can also include sending a digital communication comprising a coupon to the mobile device of the payor; and applying the coupon by scanning the digital visual code displayed on the mobile device of the payor, wherein the coupon is embedded in the digital visual code.

Furthermore, the method 1100 can also include scanning by the first computing device, a second digital visual code displayed on a third computing device of a second payor; sending an indicator of the identity of the second payor to the remote server based on scanning the second digital visual code; and in response to sending the indicator of the identity of the second payor to the remote server, receiving payments from the payor and the second payor, the payments totaling the product cost.

Figure 12:
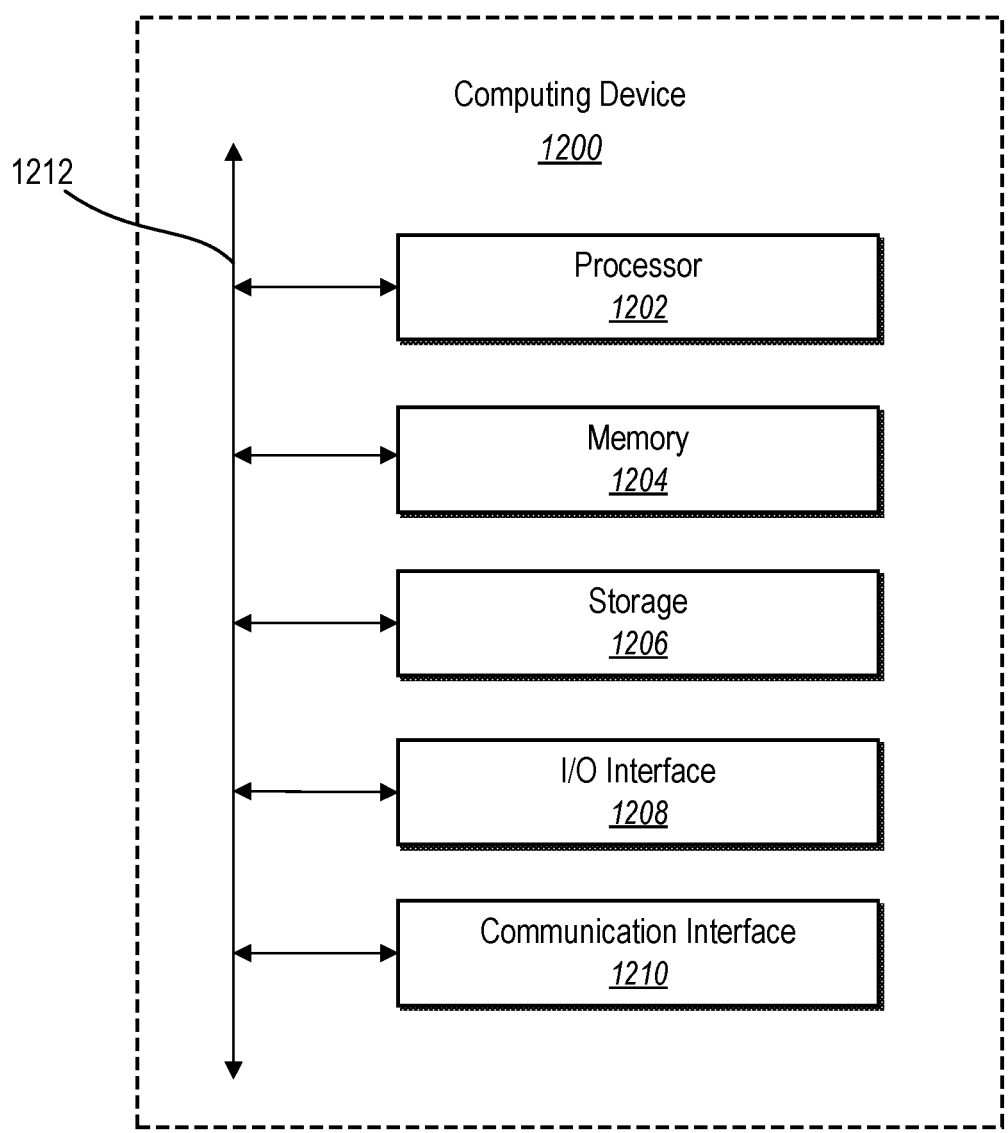
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that the payor client device 102, the payee client device 104, the server device(s) 106, the payment network 108, the computing device 200, the computing device 312, the computing device 600, the payor computing device 700, the payor client device 802, the payee client device 804, the server device(s) 806, the payment network 808, the client devices 904a-904n, the server(s) 906, and the payment network 910 each comprise one or more computing devices in accordance with implementations of computing device 1200. As shown by FIG. 12, the computing device can comprise a processor 1202, a memory 1204, a storage device 1206, an I/O interface 1208, and a communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, a computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to the computing device 1200. In particular embodiments, storage device 1206 is non-volatile, solid-state memory. In other embodiments, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, digital payment system 800 may be linked to and/or implemented within a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 13:
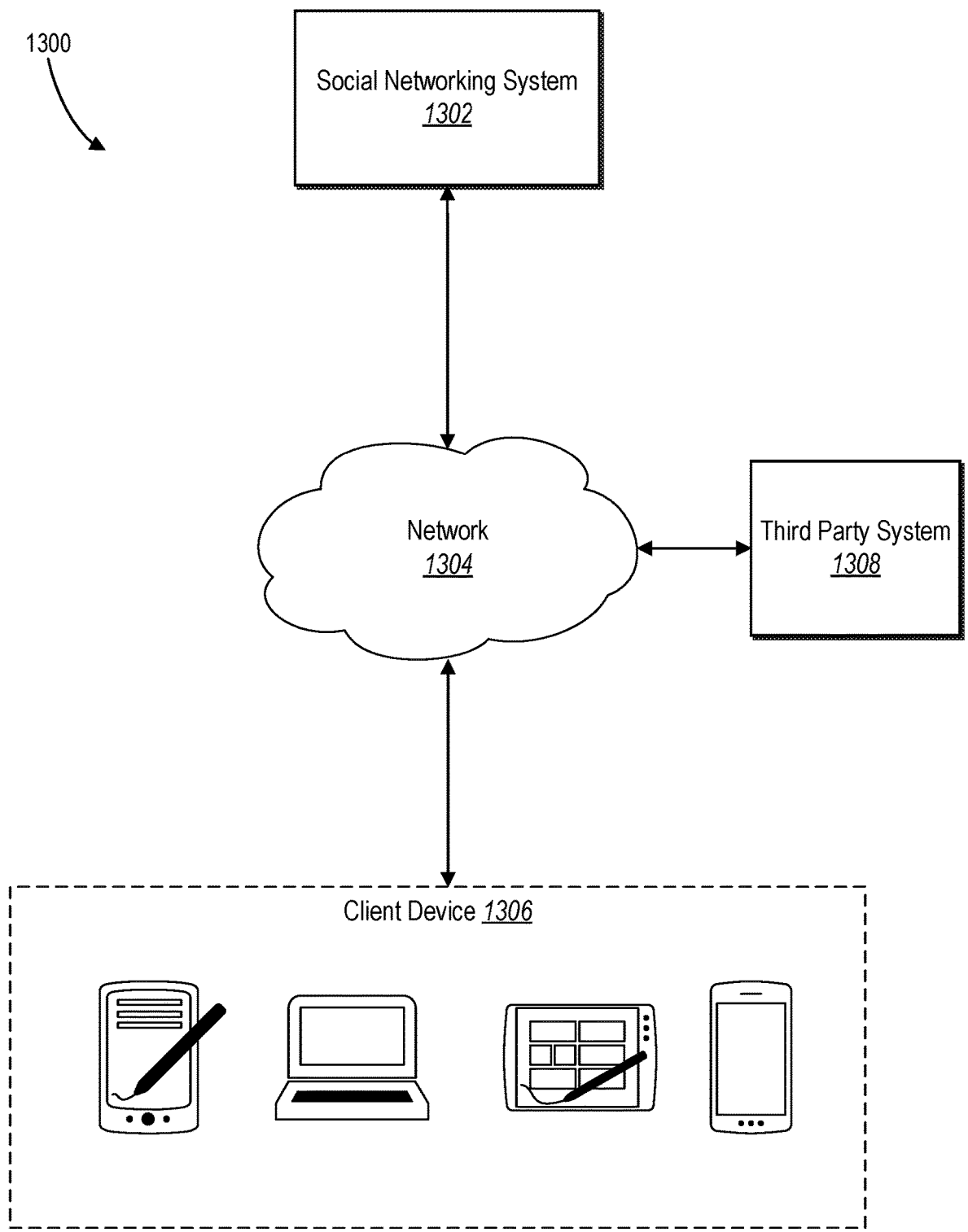
FIG. 13 illustrates a network environment of a social networking system according one or more embodiments.

FIG. 13 illustrates an example network environment of a social networking system. In particular embodiments, a social networking system 1302 may comprise one or more data stores. In particular embodiments, the social networking system 1302 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social networking system 1302 may comprise one or more computing devices (e.g., servers) hosting functionality directed to operation of the social networking system 1302. A user of the social networking system 1302 may access the social networking system 1302 using a client device such as client device 1306. In particular embodiments, the client device 1306 can interact with the social networking system 1302 through a network 1304.

The client device 1306 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access the social networking system 1302.

While these methods, systems, and user interfaces utilize both publicly available information as well as information provided by users of the social networking system, all use of such information is to be explicitly subject to all privacy settings of the involved users and the privacy policy of the social networking system as a whole.

Figure 14:
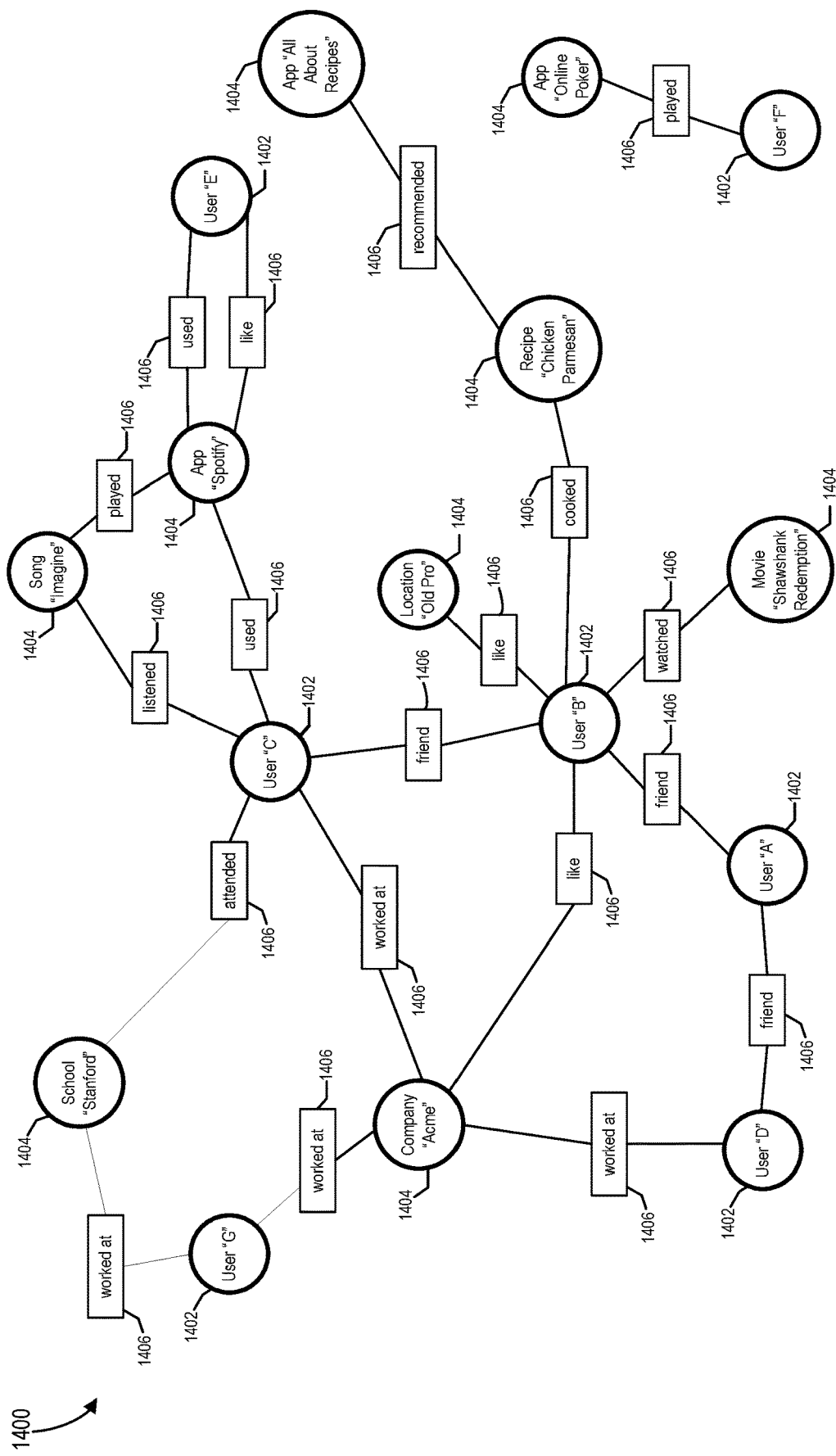
FIG. 14 illustrates an example social graph of a social networking system in accordance with one or more embodiments.

FIG. 14 illustrates example social graph 1400. In particular embodiments, social networking system 1302 may store one or more social graphs 1400 in one or more data stores. In particular embodiments, social graph 1400 may include multiple nodes—which may include multiple user nodes 1402 or multiple concept nodes 1404—and multiple edges 1406 connecting the nodes. Example social graph 1400 illustrated in FIG. 14 is shown, for didactic purposes, in a two-dimensional visual map representation. In particular embodiments, a social networking system 1302, client device 1306, or third-party system 1308 may access social graph 1400 and related social-graph information for suitable applications. The nodes and edges of social graph 1400 may be stored as data objects, for example, in a data store (such as a social-graph database). Such a data store may include one or more searchable or query able indexes of nodes or edges of social graph 1400.

In particular embodiments, a user node 1402 may correspond to a user of social networking system 1302. As an example and not by way of limitation, a user may be an individual (human user), an entity (e.g., an enterprise, business, or third-party application), or a group (e.g., of individuals or entities) that interacts or communicates with or over social networking system 1302. In particular embodiments, when a user registers for an account with social networking system 1302, social networking system 1302 may create a user node 1402 corresponding to the user, and store the user node 1402 in one or more data stores. Users and user nodes 1402 described herein may, where appropriate, refer to registered users and user nodes 1402 associated with registered users. In addition or as an alternative, users and user nodes 1402 described herein may, where appropriate, refer to users that have not registered with social networking system 1302. In particular embodiments, a user node 1402 may be associated with information provided by a user or information gathered by various systems, including social networking system 1302. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1404 may correspond to a concept. As an example and not by way of limitation, a concept may correspond to a place (such as, for example, a movie theater, restaurant, landmark, or city); a website (such as, for example, a website associated with social network system 1302 or a third-party website associated with a web-application server); an entity (such as, for example, a person, business, group, sports team, or celebrity); a resource (such as, for example, an audio file, video file, digital photo, text file, structured document, or application) which may be located within social networking system 1302 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1404 may be associated with information of a concept provided by a user or information gathered by various systems, including social networking system 1302. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1404 may be associated with one or more data objects corresponding to information associated with concept node 1404. In particular embodiments, a concept node 1404 may correspond to one or more webpages.

In particular embodiments, a node in social graph 1400 may represent or be represented by a webpage (which may be referred to as a "profile page"). Profile pages may be hosted by or accessible to social networking system 1302. Profile pages may also be hosted on third-party websites associated with a third-party server 1308. As an example and not by way of limitation, a profile page corresponding to a particular external webpage may be the particular external webpage and the profile page may correspond to a particular concept node 1404. Profile pages may be viewable by all or a selected subset of other users. As an example and not by way of limitation, a user node 1402 may have a corresponding user-profile page in which the corresponding user may add content, make declarations, or otherwise express himself or herself. As another example and not by way of limitation, a concept node 1404 may have a corresponding concept-profile page in which one or more users may add content, make declarations, or express themselves, particularly in relation to the concept corresponding to concept node 1404.

In particular embodiments, a concept node 1404 may represent a third-party webpage or resource hosted by a third-party system 1308. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1306 to send to social networking system 1302 a message indicating the user's action. In response to the message, social networking system 1302 may create an edge (e.g., an "eat" edge) between a user node 1402 corresponding to the user and a concept node 1404 corresponding to the third-party webpage or resource and store edge 1406 in one or more data stores.

In particular embodiments, a pair of nodes in social graph 1400 may be connected to each other by one or more edges 1406. An edge 1406 connecting a pair of nodes may represent a relationship between the pair of nodes. In particular embodiments, an edge 1406 may include or represent one or more data objects or attributes corresponding to the relationship between a pair of nodes. As an example and not by way of limitation, a first user may indicate that a second user is a "friend" of the first user. In response to this indication, social networking system 1302 may send a "friend request" to the second user. If the second user confirms the "friend request," social networking system 1302 may create an edge 1406 connecting the first user's user node 1402 to the second user's user node 1402 in social graph 1400 and store edge 1406 as social-graph information in one or more of data stores. In the example of FIG. 14, social graph 1400 includes an edge 1406 indicating a friend relation between user nodes 1402 of user "A" and user "B" and an edge indicating a friend relation between user nodes 1402 of user "C" and user "B." Although this disclosure describes or illustrates particular edges 1406 with particular attributes connecting particular user nodes 1402, this disclosure contemplates any suitable edges 1406 with any suitable attributes connecting user nodes 1402. As an example and not by way of limitation, an edge 1406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1400 by one or more edges 1406.

In particular embodiments, an edge 1406 between a user node 1402 and a concept node 1404 may represent a particular action or activity performed by a user associated with user node 1402 toward a concept associated with a concept node 1404. As an example and not by way of limitation, as illustrated in FIG. 14, a user may "like," "attended," "played," "listened," "cooked," "worked at," or "watched" a concept, each of which may correspond to an edge type or subtype. A concept-profile page corresponding to a concept node 1404 may include, for example, a selectable "check in" icon (such as, for example, a clickable "check in" icon) or a selectable "add to favorites" icon. Similarly, after a user clicks these icons, social networking system 1302 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1302 may create a "listened" edge 1406 and a "used" edge (as illustrated in FIG. 14) between user nodes 1402 corresponding to the user and concept nodes 1404 corresponding to the song and application to indicate that the user listened to the song and used the application. Moreover, social networking system 1302 may create a "played" edge 1406 (as illustrated in FIG. 14) between concept nodes 1404 corresponding to the song and the application to indicate that the particular song was played by the particular application. In this case, "played" edge 1406 corresponds to an action performed by an external application (SPOTIFY) on an external audio file (the song "Imagine"). Although this disclosure describes particular edges 1406 with particular attributes connecting user nodes 1402 and concept nodes 1404, this disclosure contemplates any suitable edges 1406 with any suitable attributes connecting user nodes 1402 and concept nodes 1404. Moreover, although this disclosure describes edges between a user node 1402 and a concept node 1404 representing a single relationship, this disclosure contemplates edges between a user node 1402 and a concept node 1404 representing one or more relationships. As an example and not by way of limitation, an edge 1406 may represent both that a user likes and has used at a particular concept. Alternatively, another edge 1406 may represent each type of relationship (or multiples of a single relationship) between a user node 1402 and a concept node 1404 (as illustrated in FIG. 14 between user node 1402 for user "E" and concept node 1404 for "SPOTIFY").

In particular embodiments, social networking system 1302 may create an edge 1406 between a user node 1402 and a concept node 1404 in social graph 1400. As an example and not by way of limitation, a user viewing a concept-profile page (such as, for example, by using a web browser or a special-purpose application hosted by the user's client system 1306) may indicate that he or she likes the concept represented by the concept node 1404 by clicking or selecting a "Like" icon, which may cause the user's client system 1306 to send to social networking system 1302 a message indicating the user's liking of the concept associated with the concept-profile page. In response to the message, social networking system 1302 may create an edge 1406 between user node 1402 associated with the user and concept node 1404, as illustrated by "like" edge 1406 between the user and concept node 1404. In particular embodiments, social networking system 1302 may store an edge 1406 in one or more data stores. In particular embodiments, an edge 1406 may be automatically formed by social networking system 1302 in response to a particular user action. As an example and not by way of limitation, if a first user uploads a picture, watches a movie, or listens to a song, an edge 1406 may be formed between user node 1402 corresponding to the first user and concept nodes 1404 corresponding to those concepts. Although this disclosure describes forming particular edges 1406 in particular manners, this disclosure contemplates forming any suitable edges 1406 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 1302). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1302 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1302) or RSVP (e.g., through social networking system 1302) to an event associated with the advertisement. In addition or as an alternative, an advertisement may include social-networking-system context directed to the user. As an example and not by way of limitation, an advertisement may display information about a friend of the user within social networking system 1302 who has taken an action associated with the subject matter of the advertisement.

In particular embodiments, social networking system 1302 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1308 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1302 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1302 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1302 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1302 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1302 may calculate a coefficient based on a user's actions. Social networking system 1302 may monitor such actions on the online social network, on a third-party system 1308, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1302 may calculate a coefficient based on the user's actions with particular types of content. The content may be associated with the online social network, a third-party system 1308, or another suitable system. The content may include users, profile pages, posts, news stories, headlines, instant messages, chat room conversations, emails, advertisements, pictures, video, music, other suitable objects, or any combination thereof. Social networking system 1302 may analyze a user's actions to determine whether one or more of the actions indicate an affinity for subject matter, content, other users, and so forth. As an example and not by way of limitation, if a user may make frequently posts content related to "coffee" or variants thereof, social networking system 1302 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1302 may calculate a coefficient based on the type of relationship between particular objects. Referencing the social graph 1400, social networking system 1302 may analyze the number and/or type of edges 1406 connecting particular user nodes 1402 and concept nodes 1404 when calculating a coefficient. As an example and not by way of limitation, user nodes 1402 that are connected by a spouse-type edge (representing that the two users are married) may be assigned a higher coefficient than a user nodes 1402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1302 may determine that the user has a higher coefficient with respect to the first photo than the second photo because having a tagged-in-type relationship with content may be assigned a higher weight and/or rating than having a like-type relationship with content. In particular embodiments, social networking system 1302 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1302 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1400. As an example and not by way of limitation, social-graph entities that are closer in the social graph 1400 (i.e., fewer degrees of separation) may have a higher coefficient than entities that are further apart in the social graph 1400.

In particular embodiments, social networking system 1302 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1306 of the user). A first user may be more interested in other users or concepts that are closer to the first user. As an example and not by way of limitation, if a user is one mile from an airport and two miles from a gas station, social networking system 1302 may determine that the user has a higher coefficient for the airport than the gas station based on the proximity of the airport to the user.

In particular embodiments, social networking system 1302 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1302 may provide information that is relevant to user's interests and current circumstances, increasing the likelihood that they will find such information of interest. In particular embodiments, social networking system 1302 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1302 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1302 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1308 (e.g., via an API or other communication channel), or from another suitable system. In response to the request, social networking system 1302 may calculate the coefficient (or access the coefficient information if it has previously been calculated and stored). In particular embodiments, social networking system 1302 may measure an affinity with respect to a particular process. Different processes (both internal and external to the online social network) may request a coefficient for a particular object or set of objects. Social networking system 1302 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1404 corresponding to a particular photo may have a privacy setting specifying that the photo may only be accessed by users tagged in the photo and their friends. In particular embodiments, privacy settings may allow users to opt in or opt out of having their actions logged by social networking system 1302 or shared with other systems (e.g., third-party system 1308). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1308, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1302 may send a request to the data store for the object. The request may identify the user associated with the request and may only be sent to the user (or a client system 1306 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    associating, at one or more servers, a plurality of digital visual codes with a corresponding plurality of user profiles of a social networking system, the plurality of digital visual codes comprising a first digital visual code encoding an indicator of a first user of the social networking system and the plurality of user profiles comprising a first user profile corresponding to payment credentials for the first user;
    providing, by the one or more servers, the first digital visual code encoding the indicator of the first user of the social networking system for display to a first computing device corresponding to the first user;
    without providing the payment credentials for the first user to the first computing device of the first user or a second computing device of a second user, authorizing payment between the first user and the second user utilizing the first digital visual code by:
        receiving, from the second computing device associated with the second user, the indicator of the first user and a payment amount, the indicator of the first user obtained by the second computing device by scanning the first digital visual code encoding the indicator of the first user of the social networking system displayed on the first computing device;
        accessing the payment credentials for the first user from the first user profile and digital nodes and digital edges of the social networking system based on the received indicator of the first user of the social networking system; and
        utilizing the payment credentials and the digital nodes and the digital edges of the social networking system to provide authorization for payment, by the one or more servers and a payment network, from the first user to the second user; and
    generating, at the one or more servers, a second digital visual code; and
    associating, at the one or more servers, the second digital visual code with the first user profile in place of the first digital visual code such that the first digital visual code is not operable to authorize payments from the first user.

2. The method of claim 1, wherein:
    associating the plurality of digital visual codes with the corresponding plurality of user profiles comprises associating the indicator with the first user profile; and
    providing the first digital visual code for display to the first computing device corresponding to the first user comprises: providing the indicator to the first computing device to generate the first digital visual code.

3. The method of claim 1, wherein utilizing the digital nodes and the digital edges of the social networking system comprises searching the digital nodes and the digital edges for indicators of a fraudulent transaction.

4. The method of claim 3, wherein searching the digital nodes and the digital edges for indicators of a fraudulent transaction comprises:
    comparing the digital nodes and the digital edges with transaction details of the payment to determine a digital security risk;
    determining that the digital security risk falls below a threshold; and
    providing authorization for payment based on the digital security risk falling below the threshold.

5. The method of claim 1, wherein associating the plurality of digital visual codes with the corresponding plurality of users comprises:
    determining one or more interests of the first user based on user interaction with the social networking system; and
    generating the first digital visual code by embedding data regarding the one or more interests of the first user in the first digital visual code, such that upon scanning the first digital visual code, the data regarding the one or more interests is provided to the second computing device.

6. The method of claim 1, wherein the second digital visual code encodes a second indicator of the first user of the social networking system and further comprising:
    providing the second digital visual code encoding the second indicator for the first user for display to the first computing device corresponding to the first user;

receiving, from a third computing device associated with a third user, the second indicator of the first user and an additional payment amount, the second indicator of the first user obtained by the third computing device by scanning the second digital visual code displayed on the first computing device; and in response to identifying the first user based on the received second indicator, providing authorization for payment, via the payment network, from the first user to the third user.

7. The method of claim 1, further comprising: generating the second digital visual code and associating the second digital visual code with the first user profile in place of the first digital visual code in response to receiving the indicator of the first user or in response to expiration of a time period.

8. The method of claim 4, wherein:
accessing the digital nodes and the digital edges of the social networking system comprises accessing at least one of: a calendar corresponding to the first user on the social networking system, digital comments on social networking posts corresponding to the first user on the social networking system, a list of items of interest of the first user on the social networking system, or historical interactions of the first user via the social networking system; and
comparing the digital nodes and the digital edges with the transaction details of the payment to determine the digital security risk comprises at least one of:
comparing a location corresponding to the transaction details to the calendar corresponding to the first user on the social networking system;
comparing the second user to the digital comments on the social networking posts corresponding to the first user on the social networking system;
comparing the transaction details with the items of interest of the first user on the social networking system; or
comparing the second user with the historical interactions of the first user via the social networking system.

9. The method of claim 4, wherein providing authorization for payment, via the payment network, from the first user to the second user further comprises:
determining, from a plurality of users of the social networking system, a subset of authorized users that have permissions to interact with the first user via the social networking system; and
determining that the digital security risk falls below the threshold based on determining that the second user is one of the subset of authorized users from the plurality of users that have permissions to interact with the first user via the social networking system.

10. A system comprising:
at least one processor; and
at least one non-transitory computer readable storage medium storing instructions that, when executed by the at least one processor, cause one or more servers to:
associate a plurality of digital visual codes with a corresponding plurality of users profiles of a social networking system, the plurality of digital visual codes comprising a first digital visual code encoding an indicator of a first user of the social networking system and the plurality of user profiles comparing a first user profile corresponding to payment credentials for the first user;
provide the first digital visual code encoding the indicator of the first user of the social networking system for display to a first computing device corresponding to the first user;
without providing the payment credentials of the first user to the first computing device of the first user or a second computing device of a second user, authorizing payment between the first user and the second user utilizing the first digital visual code by:
receiving, from the second computing device associated with ft the second user, the indicator of the first user and a payment amount, the indicator of the first user obtained by the second computing device by scanning the first digital visual code encoding the indicator of the first user of the social networking system displayed on the first computing device;
accessing the payment credentials for the first user from the first user profile and digital nodes and digital edges of the social networking system based on the received indicator of the first user of the social networking system; and
utilizing the payment credentials and the digital nodes and the digital edges of the social networking system to provide authorization for payment, via a payment network, from the first user to the second user;
generate a second digital visual code; and
associate the second digital visual code with the first user profile in place of the first digital visual code such that the first digital visual code is not operable to authorize payments from the first user.

11. The system of claim 10, wherein:
associating the plurality of digital visual codes with the corresponding plurality of users profiles comprises: associating the indicator with the first user profile;
providing the first digital visual code for display to the first computing device corresponding to the first user comprises: providing the indicator to the first computing device to generate the first digital visual code; and
generating the second digital visual code and associating the second digital visual code with the first user profile in place of the first digital visual code such that the first digital visual code is not operable to authorize payments from the first user comprises: associating a second indicator with the first user profile.

12. The system of claim 10, wherein associating the plurality of digital visual codes with the corresponding plurality of user profiles comprises:
determining data regarding the first user from user interaction with the social networking system; and
embedding the data regarding the first user in the first digital visual code, such that, upon scanning the first digital visual code, the data regarding the first user from user interaction with the social networking system is provided to the second computing device.

13. The system of claim 10, further comprising instructions that, when executed by the at least one processor, cause the system to: utilize the digital nodes and the digital edges of the social networking system by searching the digital nodes and the digital edges for indicators of a fraudulent transaction.

14. The system of claim 10, wherein providing authorization for payment, via the payment network, from the first user to the second user further comprises:

determining, from a plurality of users of the social networking system, a subset of authorized users that have permissions to interact with the first user via the social networking system; and providing the authorization for payment from the first user to the second user based on determining that the second user is one of the subset of authorized users from the plurality of users that have permissions to interact with the first user via the social networking system.

15. A method comprising:

associating, at one or more servers, a plurality of digital visual codes with a corresponding plurality of users profiles of a social networking system, the plurality of digital visual codes comprising a first digital visual code encoding an indicator of a first user of the social networking system and the plurality of user profiles comprising a first user profile corresponding to payment credentials of the first user;

providing, by the one or more servers, the first digital visual code encoding the indicator of the first user of the social networking system for display to a first computing device corresponding to the first user;

without providing the payment credentials for the first user to the first computing device of the first user or a second computing device of a second user, authorizing payment between the first user and the second user utilizing the digital visual code by:

receiving, from the second computing device associated with the second user, the indicator of the first user and a payment amount, the indicator of the first user obtained by the second computing device by scanning the first digital visual code encoding the indicator of the first user of the social networking system displayed on the first computing device;

based on the received indicator, accessing the payment credentials for the first user from the first user profile and one or more of: a social networking calendar, a social networking contact list, or a social networking history of the first user or the second user via the social networking system; and providing authorization for payment, by the one or more servers and a payment network, from the first user to the second user based on the payment credentials for the first user and the one or more of: the social networking calendar, the social networking contact list, or the social networking history of the first user or the second user.

16. The method of claim 15, wherein:

the first digital visual code encodes the indicator of the first user of the social networking system and an additional indicator of a third user of the social networking system; and authorizing payment comprises authorizing payment from the first user and the third user to the second user by:

receiving, from the second computing device associated with the second user, the indicator of the first user and the additional indicator of the third user, wherein the indicator of the first user and the additional indicator of the third user are obtained by the second computing device by scanning the first digital visual code encoding the indicator of the first user of the social networking system and the additional indicator of the third user of the social networking system displayed on the first computing device.

17. The method of claim 15, wherein:

associating the plurality of digital visual codes comprises associating an additional visual digital visual code encoding an additional indicator of a third user of the social networking system with an addition user profile corresponding to payment credentials of the third user;

authorizing payment comprises authorizing payment from the first user and the third user to the second user by receiving, from the second computing device associated with the second user, the indicator of the first user and the additional indicator of the third user, wherein the indicator of the first user is obtained by the second computing device by scanning the first digital visual code encoding the indicator of the first user of the social networking system displayed on the first computing device, and wherein the additional indicator of the third user is obtained by the second computing device by scanning the additional digital visual code encoding the additional indicator of the third user of the social networking system displayed on a third computing device of the third user.

18. The method of claim 15, further comprising:

associating a second digital visual code with the first user profile in place of the first digital visual code;

receiving, from a third computing device of a third user, the first digital visual code encoding the indicator of the first user of the social networking system; and in response to receiving the first digital visual code, rejecting authorization for payment from the first user to the third user.

19. The method of claim 15, wherein providing authorization for payment comprises searching the one or more of the social networking calendar, the social networking contact list, or the social networking history of the first user or the second user for indicators of fraud.

20. The method of claim 15, wherein searching the one or more of the social networking calendar, the social networking contact list, or the social networking history of the first user or the second user for indicators of fraud comprises comparing a location from the transaction details with the social networking calendar;

comparing the second user with the social networking contact list; or comparing the second user with the social networking history of the first user.

* * * * *